(12) United States Patent
Koo et al.

(10) Patent No.: US 11,526,004 B2
(45) Date of Patent: Dec. 13, 2022

(54) HEAD-MOUNTED DISPLAY DEVICE AND OPERATING METHOD OF THE SAME

(71) Applicant: SAMSUNG ELECTRONICS CO., LTD., Suwon-si (KR)

(72) Inventors: Bonkon Koo, Suwon-si (KR); Jaewoo Ko, Suwon-si (KR); Wonwoo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/818,698

(22) Filed: Mar. 13, 2020

(65) Prior Publication Data
US 2020/0326536 A1 Oct. 15, 2020

Related U.S. Application Data

(63) Continuation of application No. 16/800,414, filed on Feb. 25, 2020, now Pat. No. 11,249,305.
(Continued)

(30) Foreign Application Priority Data

Aug. 28, 2019 (KR) .................. 10-2019-0106133

(51) Int. Cl.
*G02B 27/00* (2006.01)
*G02B 27/01* (2006.01)
(Continued)

(52) U.S. Cl.
CPC ....... *G02B 27/0093* (2013.01); *G02B 27/017* (2013.01); *G06F 3/013* (2013.01);
(Continued)

(58) Field of Classification Search
CPC .. G09G 7/48; H02H 9/04; G01S 7/484; H01S 5/0014; G06T 19/006; G06F 3/012
See application file for complete search history.

(56) References Cited

U.S. PATENT DOCUMENTS 9,298,994 B2   3/2016 Marti et al.
9,313,376 B1   4/2016 Bertolami et al.
(Continued)

FOREIGN PATENT DOCUMENTS

KR   10-2012-0060978 A   6/2012
KR   10-2015-0066546 A   6/2015
(Continued)

OTHER PUBLICATIONS

"Eye Tracking" Adhawk Microsystems, Jun. 10, 2019, (6 pages total).
(Continued)

*Primary Examiner* — William Lu
(74) *Attorney, Agent, or Firm* — Sughrue Mion, PLLC

(57) ABSTRACT

A head-mounted display device includes an eye tracking sensor configured to obtain eye information by tracking both eyes of a user, a depth sensor configured to obtain depth information about one or more objects, and a processor configured to obtain information about a gaze point based on the eye information, and determine a measurement parameter of the depth sensor based on the information about the gaze point.

11 Claims, 28 Drawing Sheets

Related U.S. Application Data

(60) Provisional application No. 62/832,544, filed on Apr. 11, 2019.

(51) Int. Cl.

| | |
|---|---|
| *G06T 7/521* | (2017.01) |
| *G06T 7/593* | (2017.01) |
| *G06F 3/01* | (2006.01) |
| *G06T 19/00* | (2011.01) |
| *G06V 10/25* | (2022.01) |

(52) U.S. Cl.
CPC .............. *G06T 7/521* (2017.01); *G06T 7/593* (2017.01); *G06T 19/006* (2013.01); *G06V 10/25* (2022.01); *G02B 2027/0178* (2013.01); *G06T 2207/10028* (2013.01); *G06T 2215/16* (2013.01)

(56) References Cited

U.S. PATENT DOCUMENTS

| | | | |
|---|---|---|---|
| 9,443,350 B2 | 9/2016 | Wagenr et al. | |
| 9,582,075 B2 | 2/2017 | Luebke | |
| 9,924,866 B2 | 3/2018 | Tian | |
| 10,007,352 B2* | 6/2018 | Poulos | G06F 3/013 |
| 10,007,413 B2* | 6/2018 | Hill | G06F 3/0482 |
| 10,025,486 B2* | 7/2018 | Fein | G06F 3/0486 |
| 10,099,382 B2* | 10/2018 | Hill | B25J 9/1694 |
| 10,109,075 B2* | 10/2018 | Fein | G06F 3/011 |
| 10,165,176 B2 | 12/2018 | Frahm et al. | |
| 10,288,904 B2 | 5/2019 | Yadin et al. | |
| 10,349,194 B1 | 7/2019 | Hoffman et al. | |
| 10,404,969 B2 | 9/2019 | Lindner et al. | |
| 10,462,452 B2* | 10/2019 | Kashyap | G01S 7/484 |
| 2006/0197832 A1 | 9/2006 | Yamada et al. | |
| 2011/0018903 A1 | 1/2011 | Lapstun et al. | |
| 2012/0147328 A1* | 6/2012 | Yahav | A61B 3/113 351/210 |
| 2012/0176410 A1* | 7/2012 | Meier | G06T 19/00 345/633 |
| 2012/0206452 A1* | 8/2012 | Geisner | H04S 7/304 345/419 |
| 2013/0050432 A1* | 2/2013 | Perez | G06F 3/017 348/47 |
| 2013/0169595 A1* | 7/2013 | Chang | G06K 9/00 345/175 |
| 2013/0282345 A1* | 10/2013 | McCulloch | G06F 3/012 703/6 |
| 2013/0307855 A1* | 11/2013 | Lamb | G02B 27/017 345/473 |
| 2014/0028548 A1* | 1/2014 | Bychkov | G06F 3/011 345/156 |
| 2014/0375541 A1 | 12/2014 | Nister et al. | |
| 2015/0085251 A1* | 3/2015 | Larsen | A61B 3/113 351/206 |
| 2015/0346814 A1 | 12/2015 | Thukral et al. | |
| 2016/0027215 A1* | 1/2016 | Burns | G06F 3/013 345/626 |
| 2016/0234482 A1* | 8/2016 | Bickerstaff | H04N 13/239 |
| 2016/0295133 A1 | 10/2016 | Rudmann et al. | |
| 2016/0379418 A1* | 12/2016 | Osborn | G06T 11/40 345/589 |
| 2016/0379606 A1* | 12/2016 | Kollin | G03H 1/0005 345/428 |
| 2017/0005465 A1* | 1/2017 | Wyland | H02H 9/04 |
| 2017/0005574 A1* | 1/2017 | Wyland | H02M 3/156 |
| 2017/0061693 A1* | 3/2017 | Kohler | G06T 19/00 |
| 2017/0075421 A1* | 3/2017 | Na | H01L 27/14627 |
| 2017/0123492 A1* | 5/2017 | Marggraff | G06F 3/04845 |
| 2017/0160518 A1* | 6/2017 | Lanman | G06T 19/006 |
| 2017/0220134 A1* | 8/2017 | Burns | G02B 27/0172 |
| 2017/0353714 A1* | 12/2017 | Poulad | H04N 13/383 |
| 2018/0096503 A1* | 4/2018 | Kaehler | G06T 11/60 |
| 2018/0210547 A1 | 7/2018 | Sarkar | |
| 2018/0348861 A1* | 12/2018 | Uscinski | G06F 3/011 |
| 2019/0012771 A1* | 1/2019 | Pines | G06T 5/002 |
| 2019/0182415 A1* | 6/2019 | Sivan | H04W 4/80 |
| 2019/0235248 A1* | 8/2019 | Ollila | G06F 3/013 |
| 2020/0326775 A1* | 10/2020 | Koo | G06F 3/0304 |

FOREIGN PATENT DOCUMENTS

| | | |
|---|---|---|
| KR | 10-2016-0026565 A | 3/2016 |
| KR | 10-1817952 B1 | 1/2018 |
| KR | 10-2018-0111988 A | 10/2018 |
| WO | 2017139667 A1 | 8/2017 |

OTHER PUBLICATIONS

International Search Report (PCT/ISA/210) and Written Opinion (PCT/ISA/237) dated May 22, 2020, issued by the International Searching Authority in counterpart International Application No. PCT/KR2020/002225.

Communication dated Feb. 17, 2022 issued by the European Patent Office in counterpart European Application No. 20787395.1.

Fu-Song Hsu et al., "Human-oriented Interaction with a TOF Sensor", 2012 Southeast Asian Network of Ergonomics Societies Conference (SEANES), IEEE, DOI: 10.1109/SEANES.2012.6299581, Jul. 2012, 5 pages total, XP032235485.

* cited by examiner

FIG. 7B

| EYE INFORMATION | | | MEASUREMENT PARAMETERS (TOF SENSOR) | | | | | 750 |
|---|---|---|---|---|---|---|---|---|
| COORDINATE OF GAZE POINT | | ESTIMATED DEPTH OF GAZE POINT | PARAMETER OF TARGET REGION | | PARAMETER OF OUTPUT OF LIGHT (TOF SENSOR) | | | |
| | | | LED REGION | SENSOR REGION | MAGNITUDE OF PULSE (amplitude) | PERIOD OF PULSE (period) | CYCLE OF PULSE (duty cycle) | |
| x | y | z | P1 | P2 | P3 | P4 | P5 | |
| 3 | 4 | 3 | A1 | B1 | 2 | 2ms | 10% | |
| −2 | −5 | 5 | A3 | B3 | 2 | 2ms | 20% | |
| 4 | −1 | 8 | A4 | B4 | 7 | 2ms | 30% | |
| −5 | 1 | 10 | A2 | B2 | 7 | 5ms | 40% | |

HEAD-MOUNTED DISPLAY DEVICE AND OPERATING METHOD OF THE SAME

CROSS-REFERENCE TO RELATED APPLICATION

This application is a Continuation of U.S. application Ser. No. 16/800,414, filed Feb. 25, 2020, which is based on and claims the benefit of U.S. Provisional Patent Application No. 62/832,544, filed on Apr. 11, 2019, in the United States Patent and Trademark Office, and claims priority under 35 U.S.C. § 119 to Korean Patent Application No. 10-2019-0106133, filed on Aug. 28, 2019, in the Korean Intellectual Property Office, the disclosures of which are herein incorporated by reference in their entireties.

BACKGROUND

1. Field

The disclosure relates to a head-mounted display device capable of determining a gaze point in a real space and obtaining depth information using parameters optimized for the gaze point, and a method of operating the same.

2. Description of Related Art

The real world environment in which we live may be characterized as a three-dimensional (3D) space. A person perceives a 3D space due to a stereoscopic effect obtained by combining visual information seen by a pair of eyes. However, because a photo or a video taken by a general digital device is generated via a technology of expressing 3D coordinates in two-dimensional (2D) coordinates, the photo or the video does not include information, such as a depth of objects, about space. To express such a sense of space, 3D cameras or display products, which employ two cameras together to capture and display stereoscopic images, have been developed.

To express a sense of 3D space, depth information about objects within the real space may be necessary. Depth sensing with regard to the depth information has been performed on all ranges of space that a depth sensor is capable of measuring, without considering a region of interest (ROI) of a user. In particular, the depth sensor that projects light to perform depth sensing drives an infrared (IR) light-emitting device (LED) to project light in all ranges of space, and thus power consumption increases due to the driving of the IR LED. In addition, to obtain depth information about all ranges of space, an amount of computation increases. Accordingly, power consumption also increases. Because the power consumption of the depth sensor increases, there is a problem of mounting the depth sensor in a small device having limited power and/or computational resources.

In addition, conventional depth sensing methods may provide inaccurate depth sensing due to weakness of the depth sensors.

SUMMARY

Aspects of the disclosure relate to a head-mounted display device that determines a gaze point and obtains depth information about a preset region of interest (ROI) with respect to the gaze point using parameters optimized for the gaze point and a method of operating the head-mounted display device.

Additional aspects will be set forth in part in the description which follows and, in part, will be apparent from the description, or may be learned by practice of the presented embodiments of the disclosure.

According to an embodiment of the disclosure, a head-mounted display device may include an eye tracking sensor configured to track a position of focus of a left eye of a user and a position of focus of a right eye of the user; a depth sensor configured to obtain depth information about one or more objects; and a processor configured to determine a gaze point based on the position of focus of the left eye of the user and the position of focus of the right eye of the user, and determine a measurement parameter of the depth sensor based on the gaze point.

The processor may be further configured to obtain two-dimensional (2D) location information of the gaze point based on the eye information.

The processor may be further configured to obtain estimated depth information of the gaze point based on the position of focus of the left eye of the user and the position of focus of the right eye of the user.

The depth sensor may be further configured to obtain estimated depth information of the gaze point based on the position of focus of the left eye of the user and the position of focus of the right eye of the user.

The measurement parameter of the depth sensor may include at least one of a parameter with respect to a target region, a parameter with respect to an output of an emission light, or a parameter with respect to sensing of a reflection light.

The processor may be further configured to re-determine the measurement parameter of the depth sensor based on the depth information about the ROI, and wherein the depth sensor may be further configured to re-obtain the depth information about the ROI again according to the measurement parameter.

The depth sensor may be further configured to obtain the depth information about the ROI by using at least one of a time of flight (TOF) method, a structured light (SL) method, or a stereo image (SI) method.

When the depth sensor includes a TOF depth sensor, the processor may be further configured to determine the measurement parameter based on the 2D location information of the gaze point such that some light sources corresponding to the gaze point among light sources included in the depth sensor are driven, and wherein the depth sensor may be further configured to obtain the depth information about the ROI by driving the some light sources.

The head-mounted display device may further include a display displaying a real space including the ROI, and wherein the processor may be further configured to control the display to display at least one virtual object on the ROI based on the depth information about the ROI.

The processor may be further configured to set the measurement parameter of the depth sensor to a first parameter, based on the first parameter, control the depth sensor to obtain whole depth information about a space that the depth sensor is capable of sensing, the space including the ROI, based on the whole depth information, obtain first depth information about the ROI, based on the first depth information, set the measurement parameter of the depth sensor as a second parameter, and, based on the second parameter, control the depth sensor to obtain second depth information about the ROI.

According to another embodiment of the disclosure, a method of operating an electronic device may include tracking a position of focus of a left eye of a user and a position of focus of a right eye of the user; obtaining a gaze point based on the position of focus of the left eye of the user and the position of focus of the right eye of the user; and determining a measurement parameter of a depth sensor based on the gaze point.

According to another embodiment of the disclosure, one or more non-transitory computer-readable recording media may have recorded thereon a program for controlling an apparatus to execute the methods herein.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 6, 7A, and 7B are reference diagrams for describing a method performed by an electronic device to determine measurement parameters in the case of a depth sensor using a time of flight (TOF) method according to an embodiment of the disclosure;

DETAILED DESCRIPTION

Figure 1:
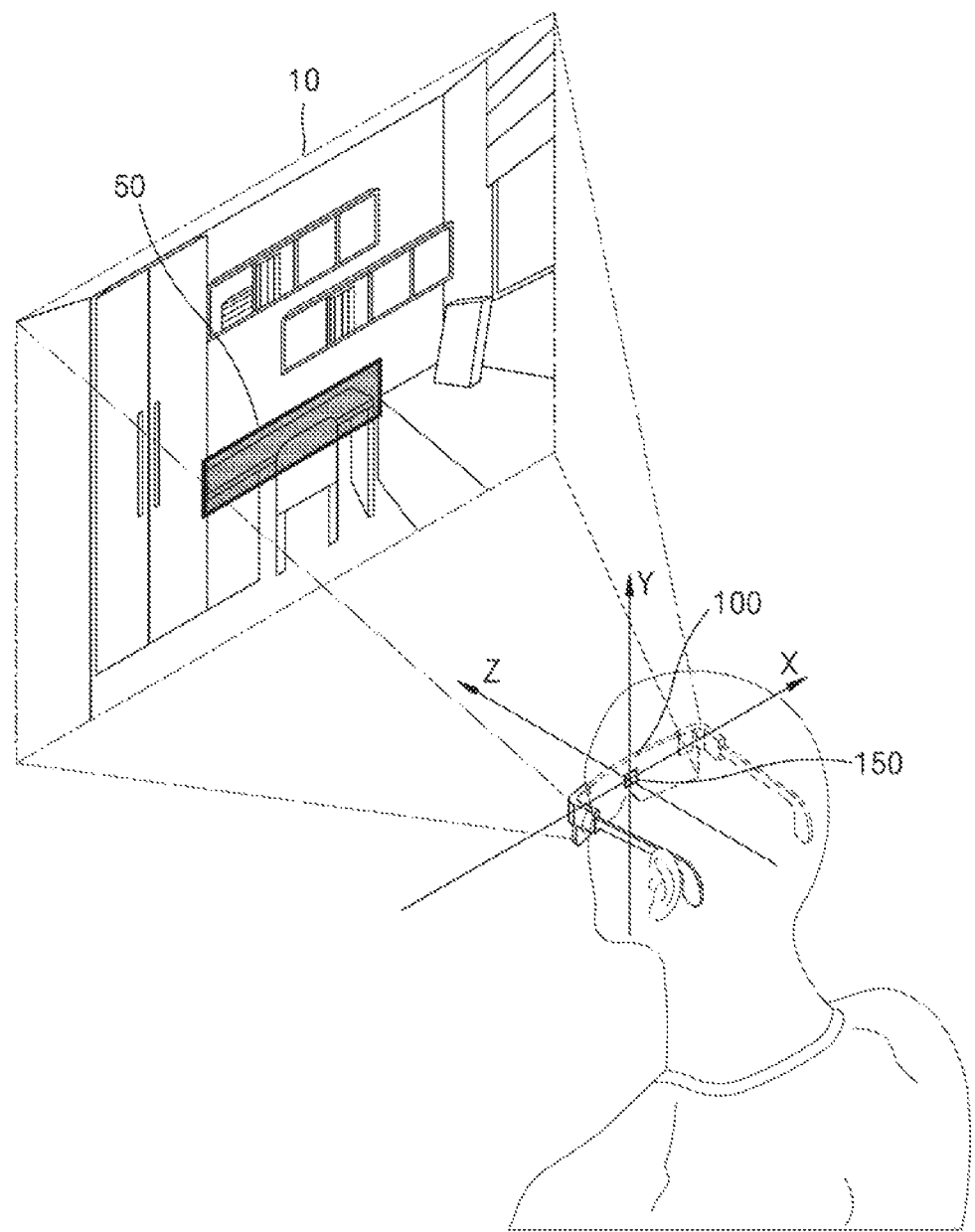
FIG. 1 is a diagram illustrating an electronic device according to an embodiment of the disclosure.

Terms used herein will be described, and the disclosure will be described in detail.

Although terms used in the disclosure are selected with general terms popularly used at present under the consideration of functions in the disclosure, the terms may vary according to the intention of those of ordinary skill in the art or introduction of new technology. In addition, in a specific case, terms may be selected and the meaning of the terms may be disclosed in a corresponding description of the disclosure. Thus, the terms used in the disclosure should be defined not by the simple names of the terms, but by the meaning of the terms and the contents throughout the disclosure.

Throughout the entirety of the disclosure, a certain part may be assumed to include a certain component, and the term 'including' means that a corresponding component may further include other components unless a specific meaning opposed to the corresponding component is described. The term used in the embodiments such as "unit" or "module" indicate a unit for processing at least one function or operation, and may be implemented in hardware, software, or in a combination of hardware and software.

Throughout the disclosure, the expression "at least one of a, b or c" indicates only a, only b, only c, both a and b, both a and c, both b and c, all of a, b, and c, or variations thereof.

Hereinafter, embodiments of the disclosure will be described in detail with reference to the attached drawings to allow those of ordinary skill in the art to easily carry out the embodiments. However, the disclosure may be implemented in various forms, and the embodiments are not limited to the embodiments described herein. To clearly describe the disclosure, parts that are not associated with the description have been omitted from the drawings, and throughout the specification, identical reference numerals refer to identical parts.

FIG. 1 is a diagram illustrating an electronic device 100 according to an embodiment of the disclosure.

Referring to FIG. 1, the electronic device 100 according to an embodiment of the disclosure may be a glasses type wearable device. The glasses type wearable device may be implemented as a head-mounted display (HMD) that is mountable on a head. For example, the HMD may include a device in the form of glasses, a helmet, a hat, and the like, but the type and form of the electronic device 100 are not limited thereto.

In addition, the electronic device 100 according to an embodiment of the disclosure may be implemented in various electronic devices such as a mobile phone, a smart phone, a laptop computer, a desktop, a tablet PC, an e-book terminal, a digital broadcasting terminal, a personal digital assistant (PDA), a portable multimedia player (PMP), a navigation device, an MP3 player, a camcorder, an Internet protocol television (IPTV), a digital television (DTV), a wearable device, etc., but the type and form of the electronic device 100 are not limited thereto.

In an embodiment of the disclosure, the term "user" refers to a person who controls functions or operations of the electronic device 100, and may include an administrator or an installation engineer.

The electronic device 100 according to an embodiment of the disclosure may be a device that provides at least one virtual object in the form of augmented reality (AR), mixed reality (MR), or virtual reality (VR).

When providing the virtual object in the form of AR or MR, the electronic device 100 may display the virtual object on a display such that the virtual object matches the shape, arrangement, distance, and depth of a real object in the real world. For example, the electronic device 100 may overlap and display an image of the virtual object on the reality of the real world, but the display of images is not limited thereto.

The electronic device 100 according to an embodiment of the disclosure may include a depth sensor 150.

The depth sensor 150 may obtain depth information about one or more objects included in the real world. The depth information may correspond to a distance from the depth sensor 150 to a specific object. As the distance from the depth sensor 150 to the specific object increases, a depth value may correspondingly increase.

As shown in FIG. 1, on a three-dimensional (3D) space, the X axis may be a reference axis passing left and right across the electronic device 100, the Y axis may be a reference axis passing up and down across the electronic device 100, and the Z axis may be a reference axis passing forward and backward across the electronic device 100. The X axis, Y axis and Z axis may be perpendicular to each other. However, any of the (+/−) X axis, the (+/−) Y axis, and the (+/−) Z axis may be assigned to a particular direction.

Accordingly, the depth information according to an embodiment of the disclosure may mean a distance on the Z axis from the depth sensor 150 to the specific object.

The depth sensor 150 according to an embodiment of the disclosure may obtain depth information of an object in various ways. For example, the depth sensor 150 may obtain the depth information using at least one of a time of flight (TOF) method, a structured light (SL) method, or a stereo image (SI) method. Each method will be described later in detail.

The depth sensor 150 according to an embodiment of the disclosure may include at least one camera (an image sensor). The depth sensor 150 may obtain depth information about an actual space included in a field of view (FOV) of the camera. Hereinafter, the actual space of the range that is capable of being sensed by the depth sensor 150 is referred to as a 'whole space'. In general, the 'whole space' corresponds to a whole region of detection of the image sensor.

Meanwhile, when a user of the electronic device 100 gazes or focuses at a partial space or a particular region in the whole space, depth information about the remaining space excluding the partial space may be less important than the space at which the user gazes. For example, while the user of the electronic device 100 gazes at a space 50 around a desk in a room space (a whole space 10) shown in FIG. 1, the electronic device 100 obtains depth information about the whole space 10 using the depth sensor 150. The depth information about the remaining space excluding the space 50 around the desk may be information of a lower importance than that of depth information of the space 50 around the desk. In the whole space 10, a point at which the user gazes and the surrounding region of the point at which the user gazes are referred to as a region of interest (ROI). According to an embodiment of the disclosure, the ROI may be a predetermined region with respect to the point within the whole space at which the user gazes.

In addition, when the electronic device 100 obtains the depth information about the whole space 10, because an amount of computation increases, power consumption may correspondingly increase. As a result, the response speed of the electronic device 100 may decrease. In addition, when the electronic device 100 does not obtain the depth information by targeting only a partial space (e.g., the gaze point of the user of the electronic device 100), but obtains the depth information by targeting the whole space 10, the accuracy of the depth information about the gaze point of the user of the electronic device 100 may be lowered.

Accordingly, the electronic device 100 according to an embodiment of the disclosure may determine the point at which the user gazes in the whole space 10. For example, the electronic device 100 may track a gaze of each eye of the user, obtain eye information thereof, and determine the point (the gaze point) at which the user gazes based on the eye information.

The electronic device 100 according to an embodiment of the disclosure may adjust a measurement parameter of the depth sensor 150 based on the determined gaze point, thereby reducing power consumption required for obtaining the depth information and improving the accuracy of the depth information.

The measurement parameters of the depth sensor 150 may be numerical information +set in advance in the depth sensor 150 as parameters necessary to obtain depth information when obtaining the depth information about at least one object using the depth sensor 150. For example, the measurement parameters of the depth sensor 150 may include a parameter with respect to a target region for emitting light, a parameter with respect to a reflection light sensing region for sensing the reflection light, a parameter with respect to an output pattern of the emission light, a parameter with respect to an output size of the emission light, a parameter with respect to a sensing speed for sensing the reflection light, a sensing period, or sensing sensitivity, etc.

FIGS. 2, 3A, 3B, 3C, and 3D are diagrams for describing a method, performed by the electronic device 100, of tracking the eye of a user according to an embodiment of the disclosure.

Figure 2:
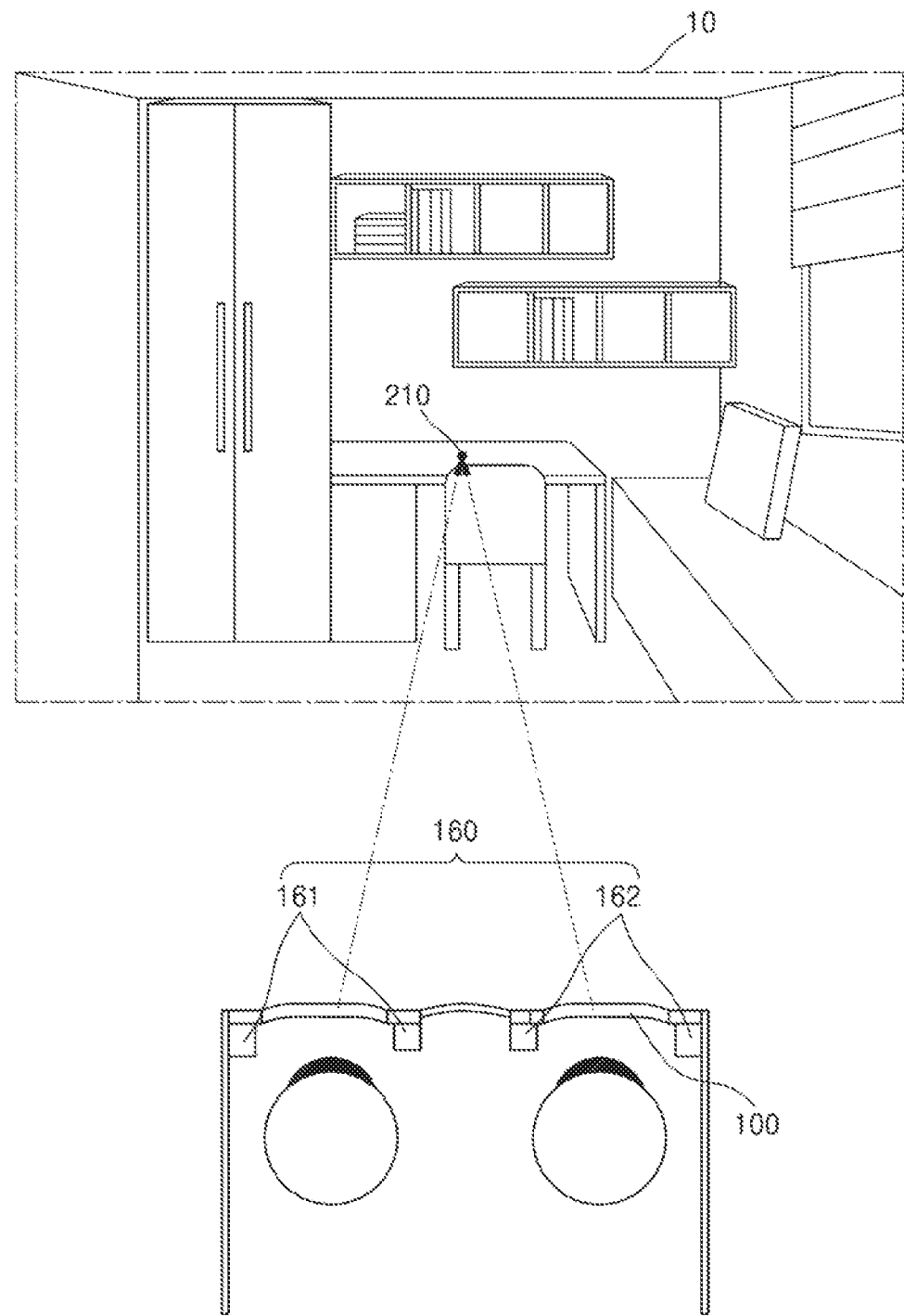
FIGS. 2, 3A, 3B, 3C, and 3*d* are diagrams for describing a method performed by an electronic device to track the eye of a user according to an embodiment of the disclosure.

Referring to FIG. 2, the electronic device 100 may track the eye of the user. In general, the direction of the 'eye' refers to a direction that the user views, and 'eye tracking' refers to a process of measuring the user's eye (e.g., a point 210 at which a user gazes) and may be performed by tracking positions and movement of both eyes.

The electronic device 100 according to an embodiment of the disclosure may include an eye tracking sensor 160 to track the eye of the user. The eye tracking sensor 160 according to an embodiment of the disclosure may include a first eye tracking sensor 161 for tracking the user's left eye and a second eye tracking sensor 162 for tracking the user's right eye. The first eye tracking sensor 161 and the second eye tracking sensor 162 have the same structure and operate in the same manner.

Figure 3A:
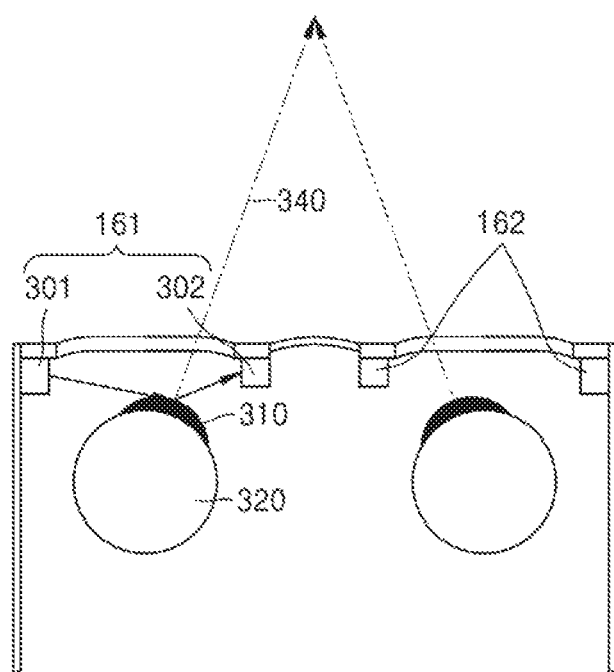

FIG. 3A is a diagram for describing a method of tracking the eye of the user based on an amount of light reflected from a user's eye 320.

The first eye tracking sensor 161 and the second eye tracking sensor 162 according to an embodiment of the disclosure have the same structure and operate in the same manner, and thus the first eye tracking sensor 161 will be described in FIG. 3A.

Referring to FIG. 3A, the first eye tracking sensor 161 according to an embodiment of the disclosure may include an illuminator 301 that provides light to the user's eye 320 and a detector 302 that detects light. The illuminator 301 may include a light source that provides light and a scanning mirror that controls a direction of the light provided from the light source. The scanning mirror may control the direction to direct the light provided from the light source toward the user's eye 320 (e.g., a cornea 310). The scanning mirror may include a structure by which a reflection angle may mechanically change to reflect the light provided from the light source and direct the light toward the user's eye 320, and may scan a region including the cornea 310 using the light provided from the light source according to the changed reflection angle.

The detector 302 may detect the light reflected from the user's eye 320 and measure an amount of the detected light. For example, when the light is reflected from the center of the user's cornea 310, the amount of the light detected by the detector 302 may be maximum. Accordingly, when the amount of the light detected by the detector 302 is maximum, the first eye tracking sensor 161 may determine an eye direction 340 of the user's eye 320 based on a point 330 at which the light is incident on and reflected from the user's eye 320. For example, when the amount of the light is maximum, the first eye tracking sensor 161 may determine the direction 340 connecting the point 330 at which the light is incident on and reflected from the user's eye 320 and a center point of the of the eye of the user's eye 320 (e.g. the user's left eye), but the method is not limited thereto.

In addition, the second eye tracking sensor 162 may also determine the eye direction of a user's eye (e.g., the user's right eye) in the same manner as described with reference to FIG. 3A.

Figure 3B:
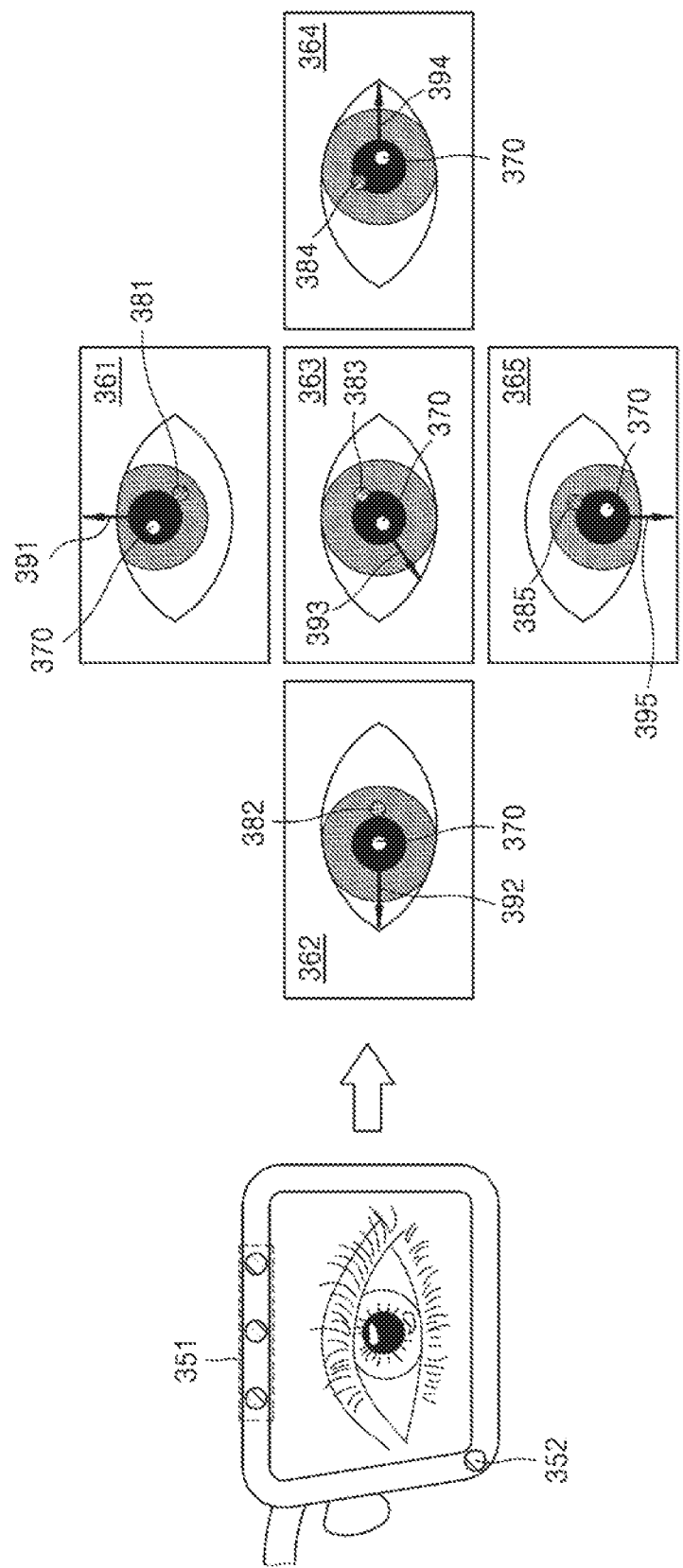

FIG. 3B is a diagram for describing a method of tracking the eye of a user based on a position of a reflection light reflected from a user's eye.

The first eye tracking sensor 161 and the second eye tracking sensor 162 according to an embodiment of the disclosure have the same structure and operate in the same manner, and thus the first eye tracking sensor 161 will be described in FIG. 3B. The first eye tracking sensor 161 may include an illuminator 351 and a capturer 352. The illuminator 351 may include an infrared light emitting diode (IR LED). As shown in FIG. 3B, the illuminator 351 may include a plurality of light emitting diodes disposed at different positions. The illuminator 351 may provide light (e.g., an infrared light) to the user's eye when the user's eye is tracked. Because the light is provided to the user's eye, the reflection light may be generated in the user's eye.

The capturer 352 may include at least one camera. At this time, the at least one camera may include an infrared camera IR. The electronic device 100 may track the user's eye (e.g., the user's left eye) using an image of the user's eye captured by the capturer 352. For example, the first eye tracking sensor 161 may track the eye of the user by detecting the pupil and the reflection light from the image of the user's eye. The first eye tracking sensor 161 may detect the positions of the pupil and the reflection light from the image of the user's eye and determine the eye direction of the user's eye based on the relationship between the position of the pupil and the position of the reflection light.

For example, the first eye tracking sensor 161 may detect a pupil 370 and a reflection light 381 from a captured first eye image 361 and determine an eye direction 391 of the user's eye based on the relationship between the position of the pupil 370 and the position of the reflection light 381. In the same manner, the first eye tracking sensor 161 may detect the pupil 370 and reflection lights 382, 383, 384, and 385, respectively, from second to fifth eye images 362, 363, 364, and 365 and determine eye directions 392, 393, 394, and 395 of the user's eye based on the relationship between the position of the pupil 370 and the positions of the reflection lights 382, 383, 384, and 385 respectively.

In addition, the second eye tracking sensor 162 may also determine the eye direction of the user's eye (e.g., the user's right eye) in the same manner as described with reference to FIG. 3B.

Figure 3C:
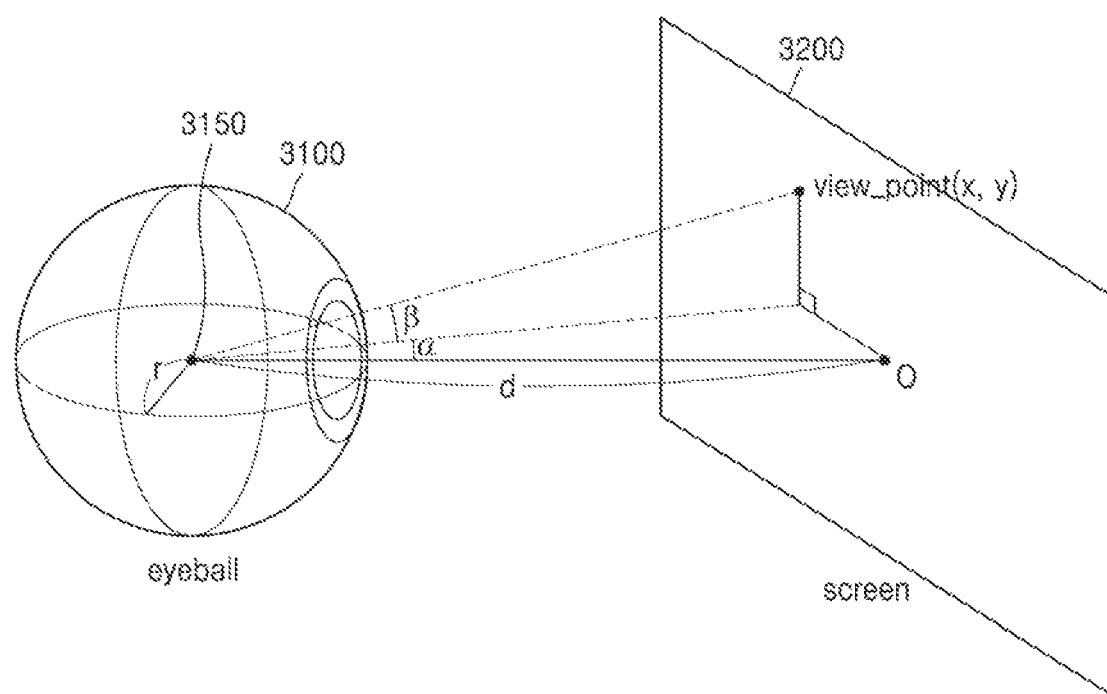

FIG. 3C is a diagram illustrating a three-dimensional (3D) eye model of the eye of a user.

Referring to FIGS. 2 and 3C, the electronic device 100 may determine the eye direction of a user's left eye using the first eye tracking sensor 161 and determine the eye direction of a user's right eye using the second eye tracking sensor 162. For example, the electronic device 100 may determine the eye direction based on an average eye model of a human. The eye model may be modeled by assuming that a human's eye 3100 is in a spherical shape and that the eye ideally rotates according to the eye direction. In addition, the eyeball model may be expressed mathematically as shown in Equations 1 and 2 below.

$$x = d \cdot \tan \alpha,$$

$$y = d \cdot \sec \alpha \cdot \tan \beta, \quad \text{[Equation 1]}$$

$$\beta = \sin^{-1}(\text{diff}\_y/r),$$

$$\alpha = \sin^{-1}(\text{diff}\_x/r \cos \beta), \quad \text{[Equation 2]}$$

In Equation 1, d denotes a distance between a center 3150 of the user's eye and a virtual screen 3200, α denotes an angle at which the user's eye rotates in an x axis direction based on the case where the user's eyes gazes at the front of the virtual screen 3200, and β denotes an angle at which the user's eye rotates in a y axis direction based on the case where the user's eyes gazes at the front of the virtual screen 3200. Also, in Equation 2, r denotes the radius of a sphere when assuming that the user's eye is the sphere.

According to an embodiment of the disclosure, the first eye tracking sensor 161 may measure the degree of rotation (e.g., α and β) of the user's eye (e.g., the left eye) using the method described with reference to FIGS. 3A and 3B. The electronic device 100 may calculate two-dimensional (2D) coordinates of the eye direction of the user's eye on the virtual screen 3200 using the degree of rotation (α and β) of the user's eye.

Figure 3D:
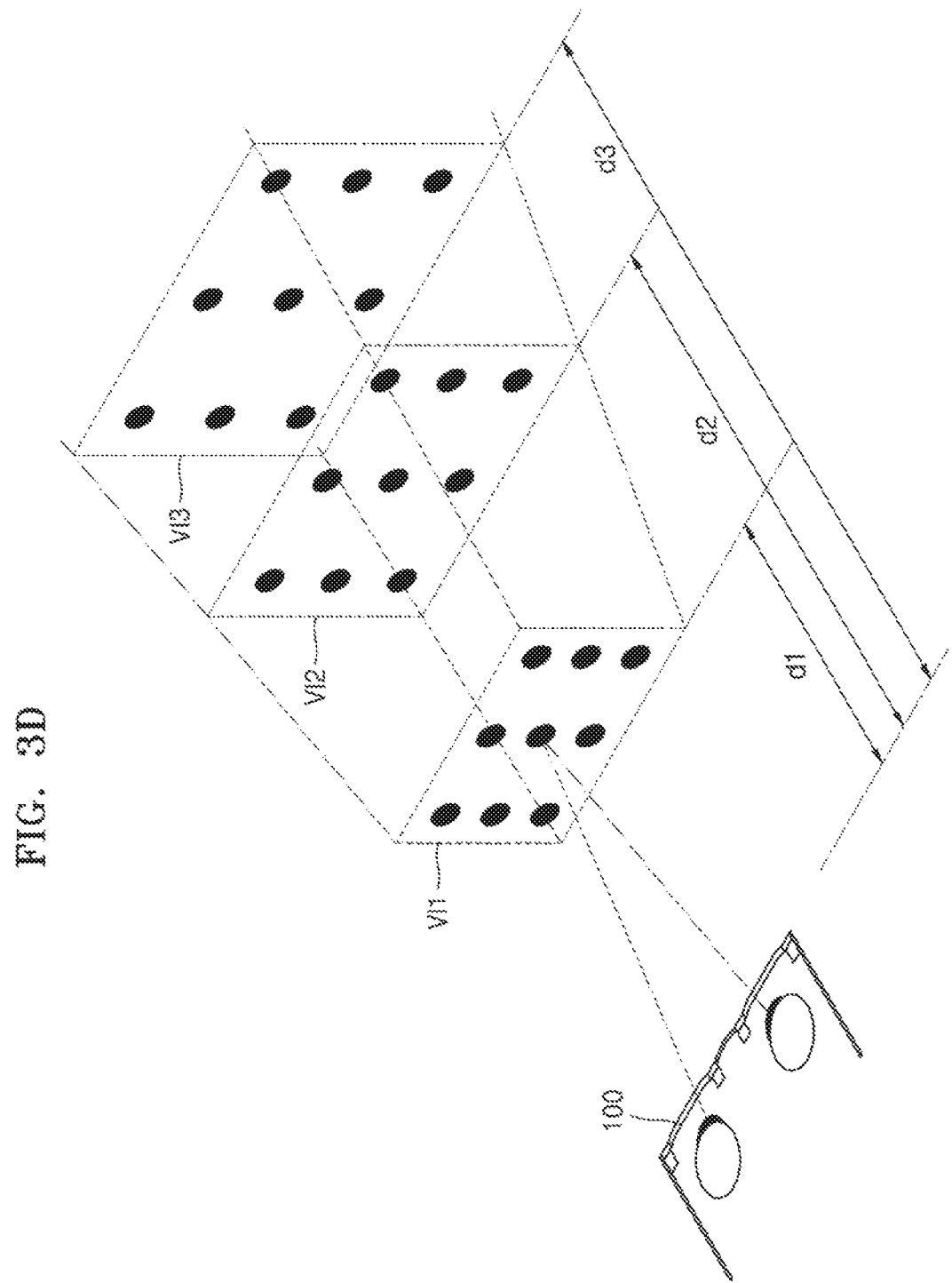

FIG. 3D is a reference diagram for describing a method of performing calibration of the eye tracking sensor 160 according to an embodiment of the disclosure.

As an example, when the user first uses the electronic device 100, the electronic device 100 may calibrate the first eye tracking sensor 161 and the second eye tracking sensor 162 to accurately measure the user's left and right eyes. The electronic device 100 may output virtual images VI1, VI2, and VI3 of different depths (e.g., d1, d2, and d3) on which a plurality of points (generally 9) for inducing the user's eye and induce a point at which the user gazes with respect to each of the plurality of points.

When the user gazes at the point included in each of the virtual images VI1, VI2, and VI3, the electronic device 100 may store information (eye information) output from the eye tracking sensor 160 in the form of a table, array, or any other data storage mechanism.

As described with reference to FIG. 3A, the electronic device 100 may store information of the reflection angle of the scanning mirror and an amount of light as the eye information for each point in a method using the amount of light reflected from the user's cornea and may store an image including the user's eye and the reflection light captured at each point as the eye information in a method capturing the user's eye by using an infrared light.

The electronic device 100 may determine the eye direction of the user's eye by comparing the stored eye information with the measured eye information output from the eye tracking sensor 160. The electronic device 100 may determine the eye direction of the user's left eye using the eye information output from the first eye tracking sensor 161 and may determine the eye direction of the user's right eye using the eye information output from the second eye tracking sensor 162.

The electronic device 100 may use the eye direction of the user's left eye, the eye direction of the right eye, and the distance between both eyes, as illustrated in FIG. 2, to estimate the coordinates of the point 210 at which the user gazes in the whole space 10.

For example, the electronic device 100 may set the point 210 at which the user gazes to be mapped as 2D coordinate information (e.g., x coordinate value and y coordinate value) in the whole space 10 described with reference to FIG. 1 by using coordinate mapping, etc. or may store the point 210 in the form of the table.

Figure 4A:
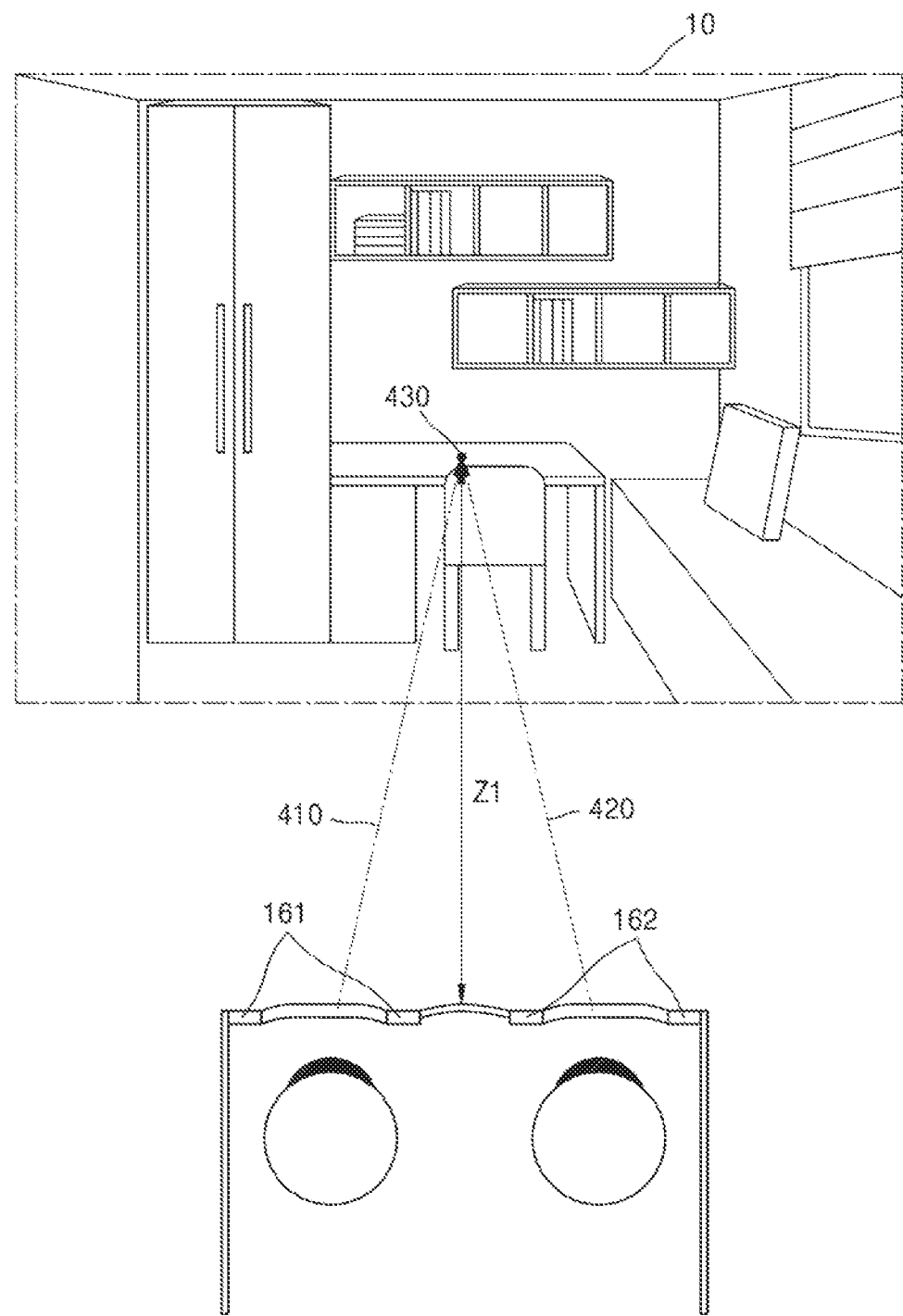
FIGS. 4A and 4B are diagrams for describing a method performed by an electronic device to obtain depth information about a gaze point according to an embodiment of the disclosure.
Figure 4B:
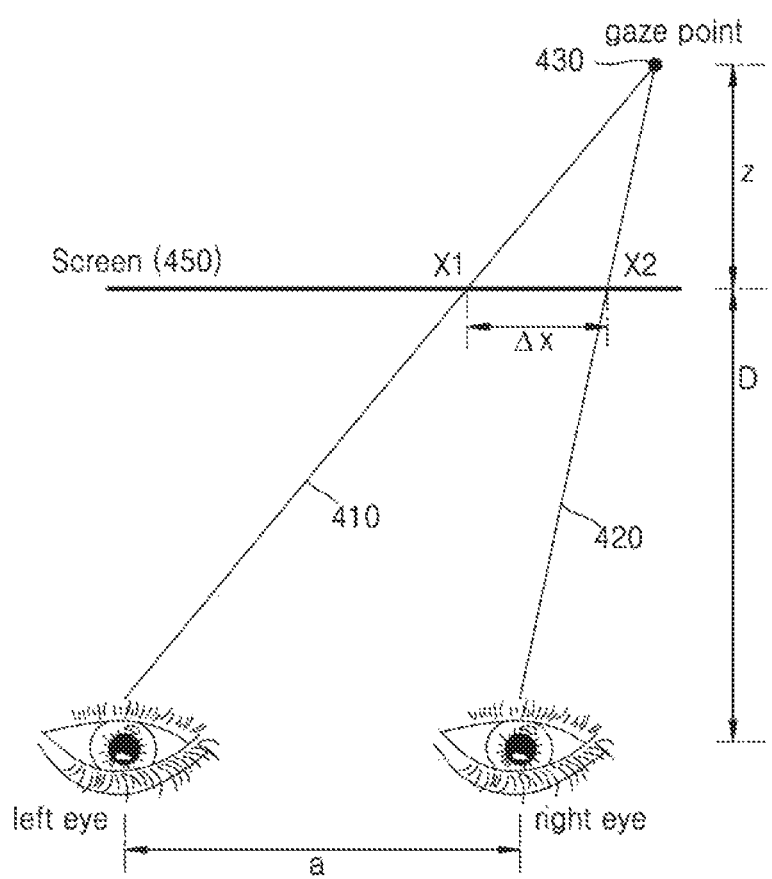

FIGS. 4A and 4B are diagrams for describing a method, performed by the electronic device 100, of obtaining depth information about a gaze point 430 according to an embodiment of the disclosure.

Referring to FIG. 4A, the electronic device 100 may use the vergence of the eye direction of the right eye and the eye direction of the left eye (intersecting two virtual straight lines indicating an eye direction) to estimate the depth information about a point at which a user gazes.

For example, as shown in FIG. 4B, the electronic device 100 may calculate a distance value Z1 to the gaze point 430 (a point at which the eye of both eyes verge) based on a first eye direction 410 corresponding to the left eye, a second eye direction 420 corresponding to the right eye, and the distance between both eyes. The electronic device 100 may obtain the depth information about the gaze point 430 by using eye information of both eyes measured using the eye tracking sensor 160 and Equation 3 below according to the geometrical arrangement illustrated in FIG. 4B.

$$\frac{-z}{\Delta x} = \frac{D-z}{a} \Rightarrow z = \frac{\Delta x D}{\Delta x - a};$$ [Equation 3]

In Equation 3, $\Delta x$ denotes a difference between an x coordinate x1 of the left eye and an x coordinate x2 of the right eye on a virtual screen 450. In this regard, the difference may be calculated assuming that the y coordinate of the left eye and the y coordinate of the right eye are the same. Also, in Equation 3, a denotes the distance between the user's both eyes, and a preset value (e.g., 7 cm) may be used. Also, D denotes a distance between the user's eyes and the virtual screen 450.

The electronic device 100 may obtain the distance value Z1 to the gaze point 430 at which the eyes of user's both eyes verge as the sum of a z value and a D value.

Alternatively, the electronic device 100 may estimate the depth information (e.g., Z1) about the gaze point 430 based on an angle formed between the first eye direction 410 and the second eye direction 420. The smaller the angle formed between the first eye direction 410 and the second eye direction 420 is, the greater the distance to the gaze point 430, and the greater the angle formed between the first eye direction 410 and the second eye direction 420 is, the closer the gaze point 430.

Figure 5A:
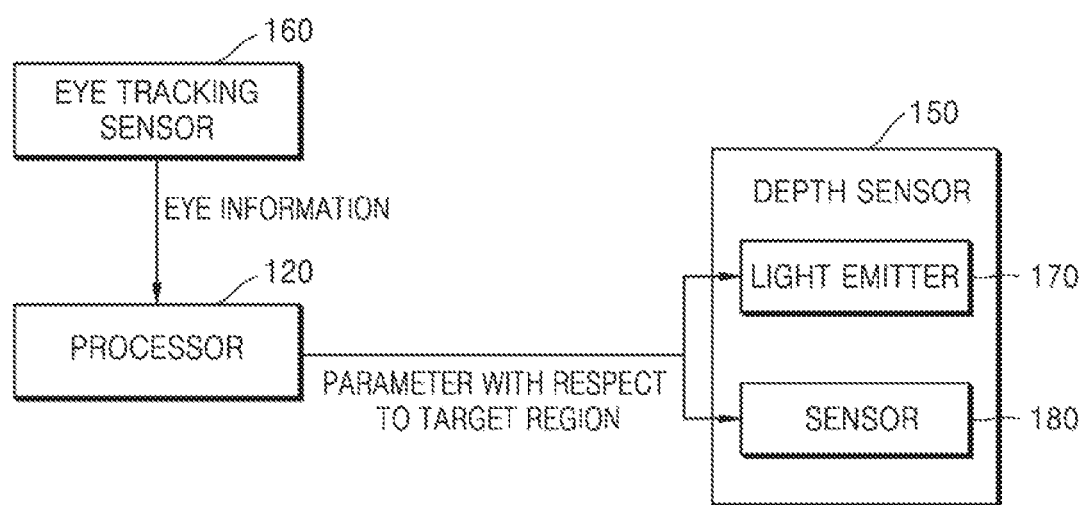
FIGS. 5A and 5B are diagrams for describing a method performed by an electronic device to determine measurement parameters of a depth sensor based on a gaze point of a user according to an embodiment of the disclosure.
Figure 5B:
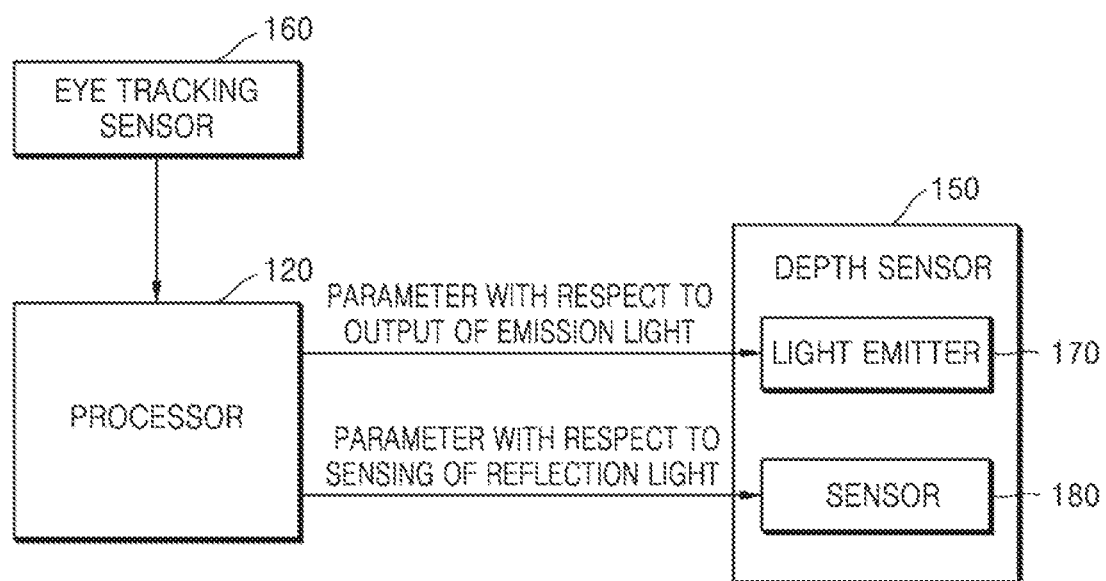

FIGS. 5A and 5B are diagrams for describing a method, performed by the electronic device 100, of determining measurement parameters of the depth sensor 150 based on a gaze point of a user according to an embodiment of the disclosure.

The measurement parameters of the depth sensor 150 may be numerical information that needs to be set in advance in the depth sensor 150 as parameters necessary to obtain depth information when obtaining the depth information about at least one object using the depth sensor 150. For example, the measurement parameters of the depth sensor 150 may include a parameter with respect to a target region for emitting light, a parameter with respect to a reflection light sensing region for sensing the reflection light, a parameter with respect to an output pattern of the emission light, a parameter with respect to an output size of the emission light, a parameter with respect to a sensing speed for sensing the reflection light, a sensing period, or sensing sensitivity, etc.

Referring to FIGS. 5A and 5B, an electronic device 100 according to an embodiment of the disclosure may include the eye tracking sensor 160, a processor 120, and the depth sensor 150.

Referring to FIG. 5A, the eye tracking sensor 160 according to an embodiment of the disclosure may obtain the eye information of a user. This is described in detail with reference to FIGS. 2 to 3D, and thus a detailed description thereof is omitted.

The eye tracking sensor 160 may transmit the eye information of the user to the processor 120. The processor 120 may obtain information about a gaze point based on the eye information of the user.

For example, the processor 120 may obtain 2D location information of the gaze point based on the eye direction (a first eye direction) for the user's left eye and the eye direction (a second eye direction) for the user's right eye included in the eye information. The processor 120 may use the first eye direction and the second eye direction to determine 2D coordinates (e.g., x coordinate values and y coordinate values) in a whole space with respect to the gaze point of the user.

The processor 120 may determine the measurement parameters of the depth sensor 150 by using the 2D location information of the gaze point. For example, the processor 120 may determine a parameter of a target region by using the 2D location information of the gaze point. The processor 120 may determine a predetermined ROI as the target region with respect to the gaze point.

The depth sensor 150 may obtain the depth information based on the determined parameter of the target region. For example, when emitting light, a light emitter 170 may limit a light emitting region to the target region (a region corresponding to the gaze point) or when sensing a reflection light, a sensor 180 may limit the light emitting region as the target region (a region corresponding to the gaze point).

Accordingly, the depth sensor 150 may obtain depth information about objects included in the target region (the gaze point and the surrounding region of the gaze point) other than the whole space.

Referring to FIG. 5B, the eye tracking sensor 160 according to an embodiment of the disclosure may obtain the eye information of the user and transmit the eye information to the processor 120. The processor 120 may obtain estimated depth information of the gaze point based on the eye information of the user. For example, the processor 120 may obtain the estimated depth information (e.g., z coordinate values) of the gaze point based on the first eye direction and the second eye direction of the user included in the eye information.

The processor 120 according to an embodiment of the disclosure may use the estimated depth information of the gaze point to determine the parameter with respect to the output of the emission light (e.g., the output pattern of the emission light and the magnitude of the output of the emission light) of the depth sensor 150.

For example, the processor 120 may determine the parameter of the depth sensor 150 such that the output pattern (the width of a light pulse) of the light emitted from the light emitter 170 is reduced when an estimated depth is small (when the distance is near) and the output pattern (the width of the light pulse) of the light emitted from the light emitter 170 increases when the estimated depth is large (when the distance is far). In addition, when the sensor 180 senses the reflection light, the processor 120 may determine the parameter of the depth sensor 150 such that when the estimated depth is small, the sensing speed or the sensing period increases. Conversely, when the estimated depth is large, the sensing speed or the sensing period decreases. Accordingly, the depth sensor 150 may obtain depth information of objects included in the ROI based on the determined parameters with respect to the output pattern (the width of a light pulse) of the light and the sensing speed or the sensing period. At this time, the ROI may be a preset region with respect to the gaze point.

In addition, the processor 120 may determine the parameter of the depth sensor 150 such that when the estimated depth of the gaze point is small, the output of the light emitted from the light emitter 170 is reduced. Conversely, when the estimated depth is large, the output of the light emitted from the light emitter 170 increases. In addition, when the sensor 180 senses the reflection light, the electronic device 100 may determine the parameter of the depth sensor 150 such that when the estimated depth is small, sensitivity is reduced. Conversely, when the estimated depth is large, the sensitivity increases. Accordingly, the depth sensor 150 may obtain depth information of objects included in the ROI in consideration of the determined magnitude of the output of light and the sensing sensitivity. At this time, the ROI may be a preset region with respect to the gaze point.

Hereinafter, examples in which measurement parameters of a depth sensor are determined based on the information (the 2D location information of the gaze point and the estimated depth information of the gaze point) about the gaze point will be described in detail according to the type of the depth sensor.

Figure 6:
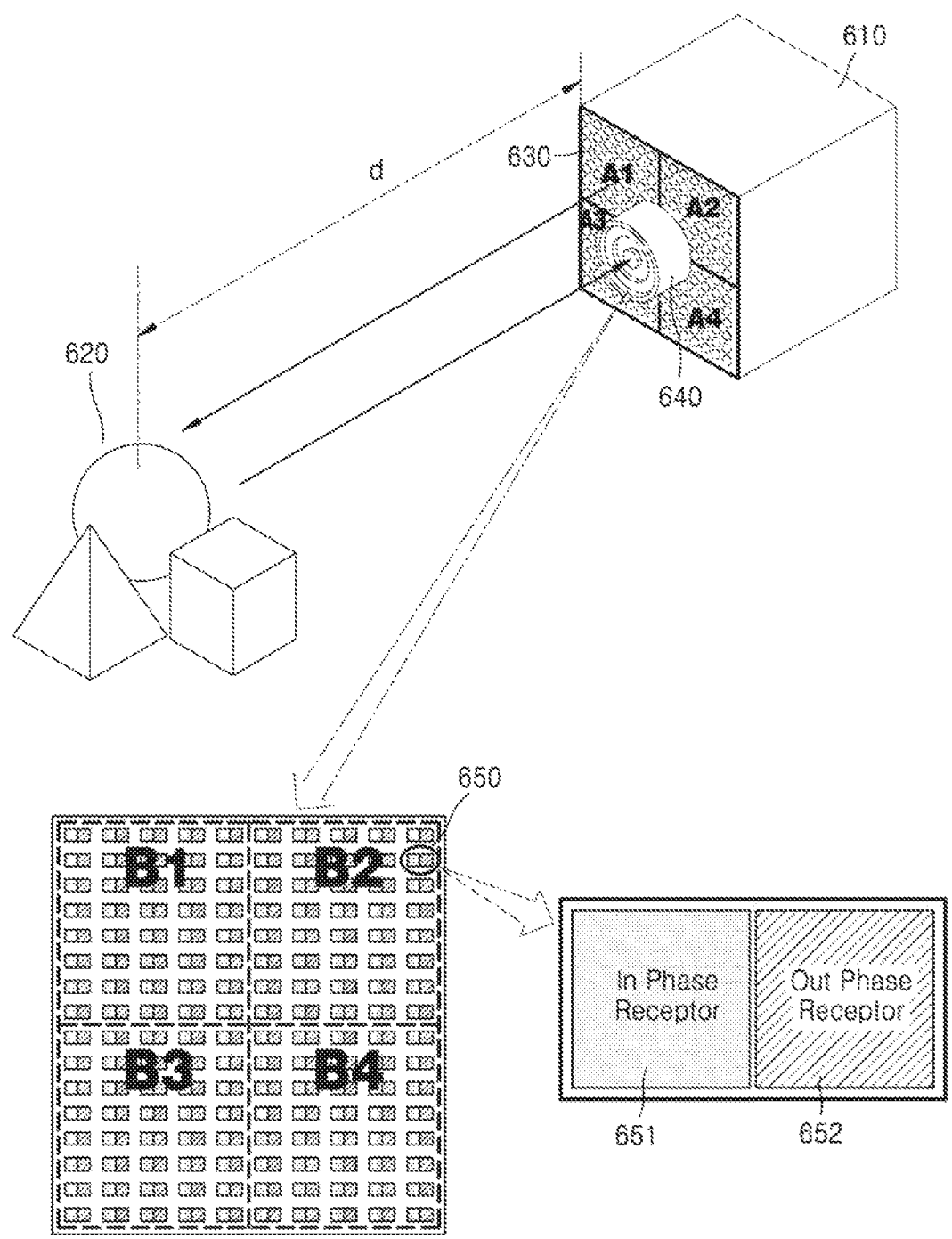

FIGS. 6 to 7B are reference diagrams for describing a method, performed by an electronic device, of determining measurement parameters when the depth sensor 150 uses a TOF method according to an embodiment of the disclosure.

The depth sensor 150 according to an embodiment of the disclosure may include a time-of-flight (TOF) depth sensor 610.

The TOF method is a method of analyzing a time taken for light to be reflected from an object 620 and return and measuring a distance d to the object 620. The TOF depth sensor 610 may include a light emitter 630 and a sensor unit 640.

The light emitter 630 may be arranged to surround the sensor unit 640, but the configuration is not limited thereto. The sensor 640 may be arranged to surround the light emitter 630.

The light emitter 630 may include a light source that generates light of a predetermined wavelength. The light source may include an infrared light emitting diode (IR LED) a laser diode (LD) capable of emitting light of an infrared wavelength invisible to the human eye, but is not limited thereto, and the wavelength band and the kind of the light source may be variously configured. The light emitter 630 may emit the light to the object 620 by driving the light source according to a control signal. For example, the light emitter 630 may emit the light to the object 620 by repeatedly turning on and turning off the light source light in an alternating fashion.

The sensor unit 640 may sense a reflection light that is reflected from the object 620 and returns. For example, the sensor unit 640 may include an optical sensing element such as a pinned photo diode (PPD), a photogate, a charge coupled device (CCD), etc. The sensor unit 640 may include a plurality of sensors arranged in an array, and one cell 650 included in the array may be configured to form a pair of an in-phase receptor 651 and an out-phase receptor 652. At this time, the in-phase receptor 651 may be activated only in an in-phase state (while the light emitter 630 emits light) to detect the light, and the out-phase receptor 652 may be activated only in an out-phase state (while the light emitter 630 does not emit the light) to detect the light.

Figure 7A:
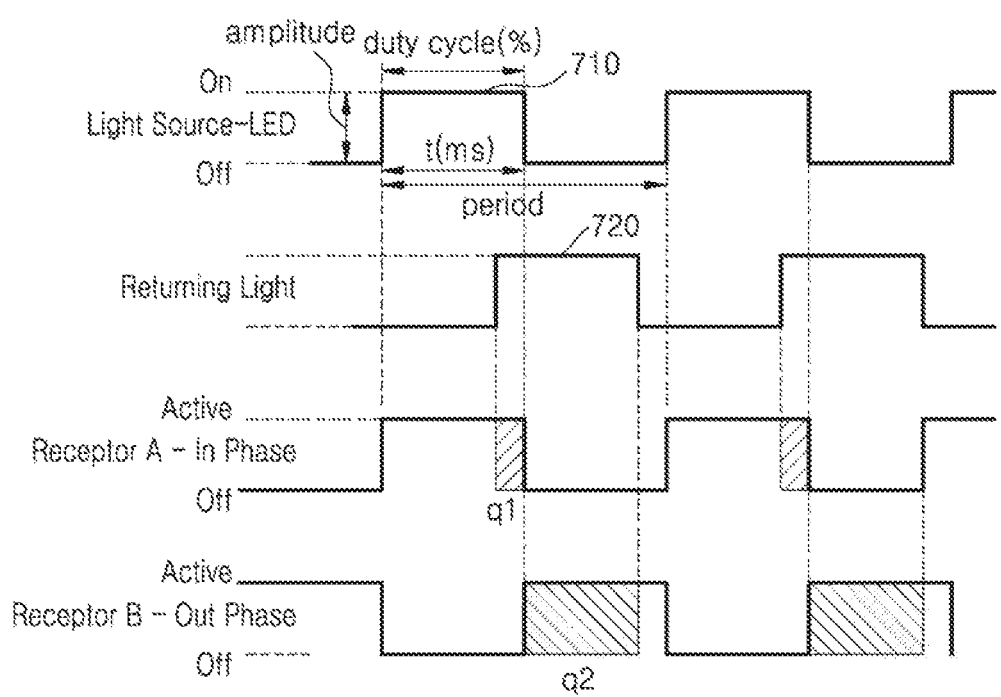

FIG. 7A is a graph illustrating light 710 emitted from the light emitter 630, a reflection light 720, light received by an in-phase receptor, and light received at an out-phase receptor.

The light 710 emitted from the light emitter 630 may be reflected from the object 620, which is separated from the depth sensor 610 by the predetermined distance d, and return. The reflection light 720 may cause a time delay to occur by the predetermined distance d compared to the emitted light 710. For example, the light may not be received during a certain section in the operation section of the in-phase receptor activated only when the light emitter 630 emits the light 710. Also, to the contrary, the reflected light may be received during a certain section in the operation section of the out-phase receptor. The in-phase receptor and the out-phase receptor may measure an amount of the received light. For example, the in-phase receptor and the out-phase receptor may receive light reflected from an object, generate and accumulate electrons, thereby measuring an amount (a charge amount) of the accumulated electrons. The distance d to the object 620 may be calculated as in Equation 4 below.

$$d = \frac{c \cdot t}{2} \frac{q2}{q1 + q2} \quad \text{[Equation 4]}$$

Here, c denotes a light speed, t denotes the length of a pulse of the light 710, q1 denotes the amount of accumulated charges (the amount of charges measured by the in-phase receptor) when the light is emitted, and q2 denotes an amount of accumulated charges (the amount of charges measured by the out-phase receptor) when light is not emitted. That is, the farther the distance d, the later the point to start receiving the reflected light. Accordingly, q2 may relatively increase compared to q1. As a result, the TOF depth sensor 610 may calculate depth information using Equation 4.

Meanwhile, the electronic device 100 according to an embodiment of the disclosure may determine a gaze point in a whole space by using eye information of a user. The electronic device 100 may obtain the eye information of the user using the eye tracking sensor 160 and may obtain 2D location information of the gaze point based on the eye information of the user.

The electronic device 100 according to an embodiment of the disclosure may control the light emitter 630 and the sensor unit 640 based on the 2D location information of the gaze point.

Referring back to FIG. 6, the light emitter 630 according to an embodiment of the disclosure may split into a plurality of regions. The electronic device 100 may drive light sources for each region. The electronic device 100 may drive light sources included in a region corresponding to the 2D location information of the gaze point among the plurality of regions. For example, when the light emitter 630 splits into four regions A1, A2, A3, and A4, the electronic device 100 may drive light sources included in the first region A1 corresponding to the 2D location information of the gaze point and may not drive light sources included in the remaining second to fourth regions A2, A3, and A4.

Accordingly, power consumption according to driving of the light source may be reduced. In addition, the sensor unit 640 may also split into a plurality of regions. The electronic device 100 may drive only the light sources included in the region corresponding to the 2D location information of the gaze point among the plurality of regions. For example, when the sensor unit 640 split into four regions B1, B2, B3, and B4, the electronic device 100 may sense a signal by driving sensors included in only the first region B1 corresponding to the 2D location information of the gaze point. Accordingly, power consumption according to calculation of the depth information may be reduced.

The electronic device 100 according to an embodiment of the disclosure may drive only a light source of a region corresponding to the 2D location information of the gaze point in the light emitter 630 included in the depth sensor, based on the 2D location information of the gaze point, sense a signal by driving only sensors included in the region corresponding to the 2D location information of the gaze point in the sensor unit 640, and calculate the depth information.

In addition, the electronic device 100 according to an embodiment of the disclosure may determine the length, magnitude, etc. of the pulse of the emitted light 710 as optimized parameters based on the estimated depth information of the gaze point. For example, the electronic device 100 may determine the length, magnitude (the output of light), etc. of the pulse of the light 710 based on the estimated depth information of the gaze point. For example, when the estimated depth is small (when the distance is near), the electronic device 100 may reduce the length (the wavelength of the light) of the pulse of the light 710 projected by the light emitter 630 and reduce the output of the pulse of the light 710. In addition, when the estimated depth is large (i.e., the distance is far), the electronic device 100 may increase the length (the wavelength of the light) of the pulse of the light 710 projected by the light emitter 630 and increase the output of the pulse of the light 710.

In addition, when the sensor unit 640 senses a reflection light pulse, the electronic device 100 may reduce the sensing speed and lower the sensing sensitivity when the estimated depth is small. In addition, the electronic device 100 may decrease the sensing speed and increase the sensing sensitivity when the estimated depth is large. As described above, because the measurement parameters of the depth sensor may be determined as parameters optimized for the gaze point, the accuracy of the depth information about the gaze point may be improved.

The electronic device 100 may calculate depth information about the ROI without calculating depth information of the whole space. Accordingly, the speed of calculating the depth information may increase, and power consumption may be reduced.

In addition, the electronic device 100 according to an embodiment of the disclosure may re-optimize the measurement parameters of the depth sensor based on the depth information (actual depth information) calculated by the depth sensor, and perform depth sensing using the re-optimized measurement parameters. Accordingly, the accuracy of the depth information may be further improved.

FIG. 7B is a diagram for describing a method, performed by the electronic device 100, of determining measurement parameters of a depth sensor using a matching table 750 according to an embodiment of the disclosure.

The matching table 750 illustrated in FIG. 7B is a table that corresponds to the eye information of the user and the measurement parameters of the depth sensor and may be stored in the electronic device 100 according to an embodiment of the disclosure. The electronic device 100 according to an embodiment of the disclosure may control the light emitter 630 and the sensor unit 640 of FIG. 6 using the matching table 750.

The electronic device 100 may obtain the 2D location information (x coordinate and y coordinate) of the gaze point and the estimated depth information (z coordinate) based on the eye information of the user obtained from the eye tracking sensor 160, and determine the measurement parameters corresponding to the obtained 2D location information and the estimated depth information by using the matching table 750.

For example, when the 2D location information of the gaze point is (3, 4) and the z value of the estimated depth information is 3, the electronic device 100 may drive light sources included in the first region A1 of the light emitter 630 and may not drive light sources included in the remaining second to fourth regions A2, A3, and A4. In addition, the electronic device 100 may drive only sensors included in the first region B1 of the sensor unit 640 to sense a signal. The electronic device 100 may control the light emitter 630 such that the magnitude of the pulse of the light 710 output from the light emitter 630 is 2, the period of the pulse of the light 710 is 2 ms, and the duty cycle of the pulse of the light 710 is 10%.

Alternatively, when the 2D location information of the gaze point is (−2, −5) and the z value of the estimated depth information is 5, the electronic device 100 may drive light sources included in the third region A3 of the light emitter 630 and may not drive light sources included in the remaining first, second, and fourth regions A1, A2, and A4. In addition, the electronic device 100 may drive only sensors included in the third region B3 of the sensor unit 640 to sense the signal. The electronic device 100 may control the light emitter 630 such that the magnitude of the pulse of the light 710 output from the light emitter 630 is 2, the period of the pulse of the light 710 is 2 ms, and the duty cycle of the pulse of the light 710 is 20%.

The electronic device 100 according to an embodiment of the disclosure may calculate measurement parameters (e.g., a parameter with respect to a target region, a parameter with respect to the output of an emission light, a parameter with respect to the sensing of a reflection light, etc.) of the depth sensor in real time based on the eye information (the 2D location information of the gaze point and the estimated depth information) of the user obtained from the eye tracking sensor 160. At this time, the electronic device 100 may calculate the measurement parameters of the depth sensor using a preset equation or algorithm.

The electronic device 100 may control the light emitter 630 and the sensor unit 640 of the depth sensor by using the measurement parameters calculated in real time.

Meanwhile, the electronic device 100 according to an embodiment of the disclosure may perform wired or wireless communication (e.g., Wi-Fi, Bluetooth, Zigbee, infrared rays, etc.) with an external device. The electronic device 100 may transmit the eye information (the 2D location information of the gaze point and the estimated depth information) of the user obtained from the eye tracking sensor 160 to the external device.

For example, the matching table 750 of FIG. 7B may be stored in the external device connected to the electronic device 100 through wired or wireless communication. Based on the eye information and the matching table 750 received from the electronic device 100, the external device may determine the measurement parameters (e.g., the parameter with respect to the target region, the parameter with respect to the output of the emission light, the parameter with respect to the sensing of the reflection light, etc.) of the depth sensor.

Alternatively, the external device may calculate the measurement parameters (e.g., the parameter with respect to the target region, the parameter with respect to the output of the emission light, the parameter with respect to the sensing of the reflection light, etc.) of the depth sensor in real time based on the eye information received from the electronic device 100. At this time, the external device may calculate the measurement parameters by using a preset equation or algorithm.

The external device may transmit the measurement parameters of the depth sensor to the electronic device 100. The electronic device 100 may use the received measurement parameters of the depth sensor to control the light emitter 30 and the sensor unit 640 of the depth sensor, but the configuration is not limited thereto.

Figure 8:
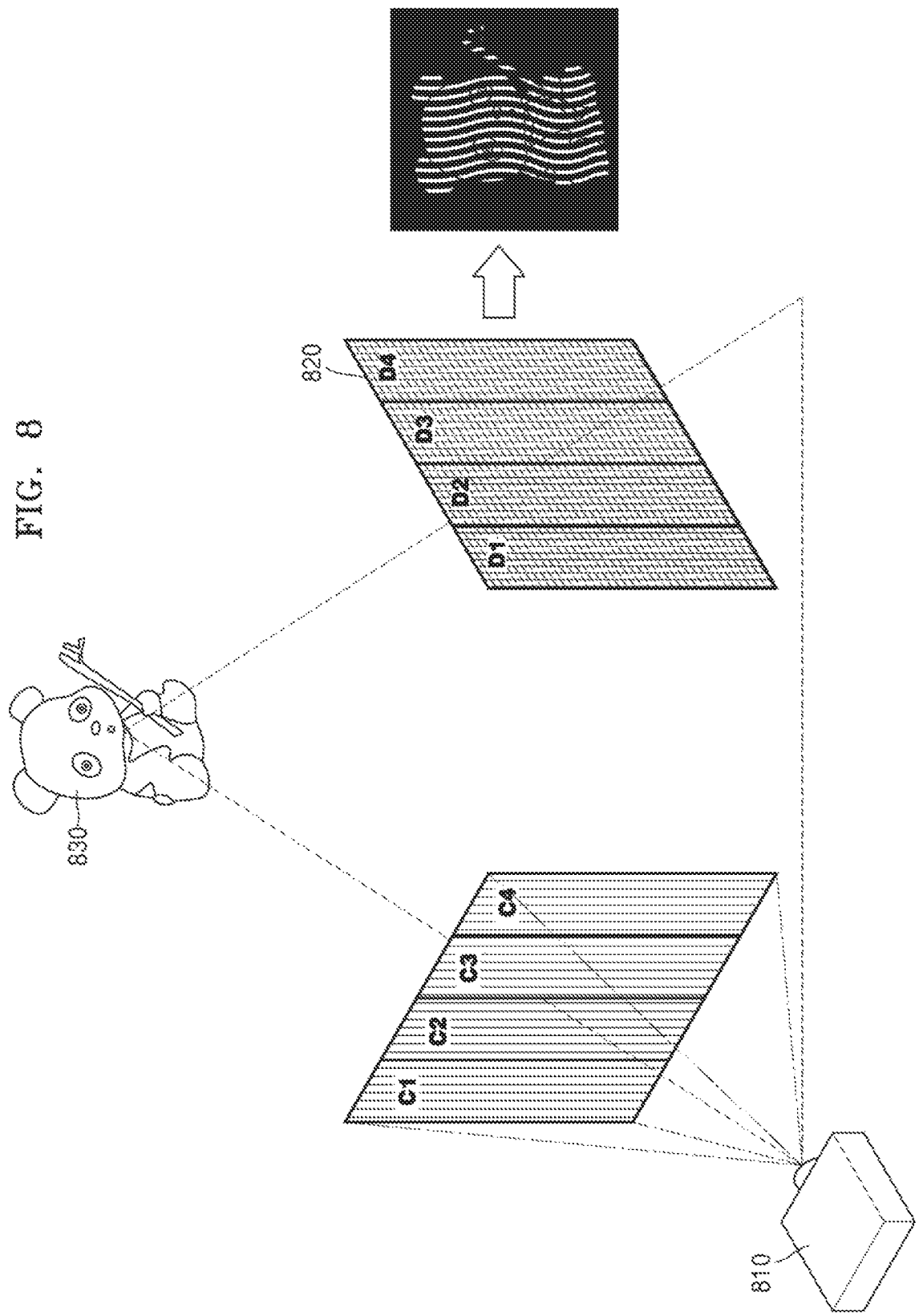
FIGS. 8 and 9 are reference diagrams for describing a method performed by an electronic device to determine measurement parameters in the case of a depth sensor using a structured light (SL) method according to an embodiment of the disclosure.
Figure 9:
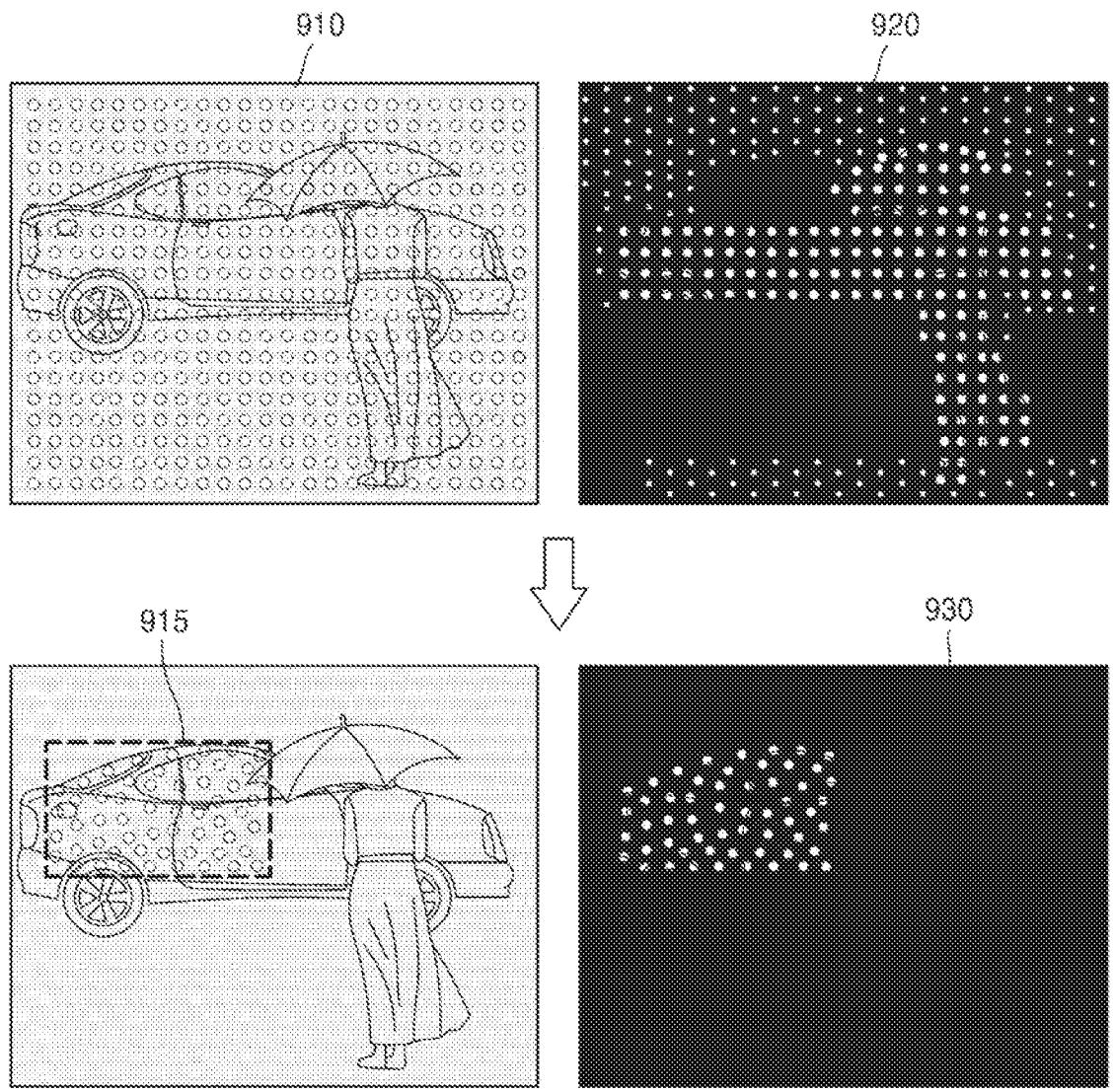

FIGS. 8 and 9 are reference diagrams for describing a method, performed by the electronic device 100, of determining measurement parameters when the depth sensor 150 uses a structured light (SL) method according to an embodiment of the disclosure.

The depth sensor 150 according to an embodiment of the disclosure may include an SL depth sensor. The SL method is a method of reflecting light of a pattern on the object 830, analyzing the shape and position of the pattern formed on the surface of the object 830, and measuring a distance (depth information) to the object 830. In general, the SL depth sensor may project the light of a linear pattern or a dot pattern onto the object 830. The form or pattern of the light formed on the object 830 may change according to the bending of the object 830. The SL method may include a light projector 810 and a camera 820, and may be regarded as a structure in which one of two cameras used in a stereo image type depth sensor is replaced with the light projector 810. In general, a film of a fixed pattern or a liquid crystal film capable of changing a pattern shape may be disposed on a path of light projected by the light projector 810, and the light may pass through the film, and thus the form or pattern of the light may change. For example, the SL depth sensor may analyze the shape and the position of the pattern formed by the light projected by the light projector 810 on the surface of the object 830 by using an algorithm to calculate depth information.

Meanwhile, the electronic device 100 according to an embodiment of the disclosure may determine a gaze point in a whole space by using eye information of a user. The electronic device 100 may obtain the eye information of the user by using an eye tracking sensor and may obtain 2D location information of the gaze point based on the eye information of the user. The electronic device 100 according to an embodiment of the disclosure may control the light projector 810 and the camera 820 based on the 2D location information of the gaze point.

The electronic device 100 according to an embodiment of the disclosure may control the light projector 810 to project light only to a region corresponding to the 2D location information of the gaze point. For example, the optical projector 810 may change the pattern of the liquid crystal film to project the light to pass through a second region C2 corresponding to the 2D location information of the gaze point, and may not project light that passes through a first region, a third region, and a fourth region C1, C3, and C4. Accordingly, power consumption according to driving of the light source may be reduced.

In addition, the camera 820 may also split into a plurality of regions D1, D2, D3, and D4, and the electronic device 100 may calculate the depth information using only image signals obtained in a region corresponding to the 2D location information of the gaze point among the plurality of regions D1, D2, D3, and D4.

For example, a first image 910 illustrated in FIG. 9 may be an image showing that light of a fixed pattern as a whole is projected onto a real space. The camera 820 may capture a pattern generated by the projected light formed on the surface of an object. For example, a second image 920 illustrated in FIG. 9 may be an image of a pattern generated by light projected onto the whole real space. The electronic device 100 may calculate depth information about the real space by analyzing the second image 920.

The electronic device 100 according to an embodiment of the disclosure may determine a gaze point in the whole space by using eye information of both eyes of a user. The electronic device 100 may obtain the eye information of both eyes by using an eye tracking sensor, and may obtain 2D location information of a gaze point based on the eye information of both eyes.

When the 2D location information of the gaze point is obtained based on the eye information of both eyes, the electronic device 100 according to an embodiment of the disclosure may project the light of the fixed pattern onto only an ROI based on the 2D location information of the gaze point. The electronic device 100 may determine a preset region with respect to the gaze point to which the eyes are directed as the ROI. For example, as shown in FIG. 9, a light projector may project the light of the fixed pattern onto only a rear portion 915 (an ROI) of a vehicle, and a camera may obtain a third image 930 capturing the ROI 915 onto which the light is projected.

Accordingly, the electronic device 100 may calculate the depth information about the ROI 915 without calculating depth information of the whole space, thereby increasing the speed of calculating the depth information and reducing power consumption.

Figure 10:
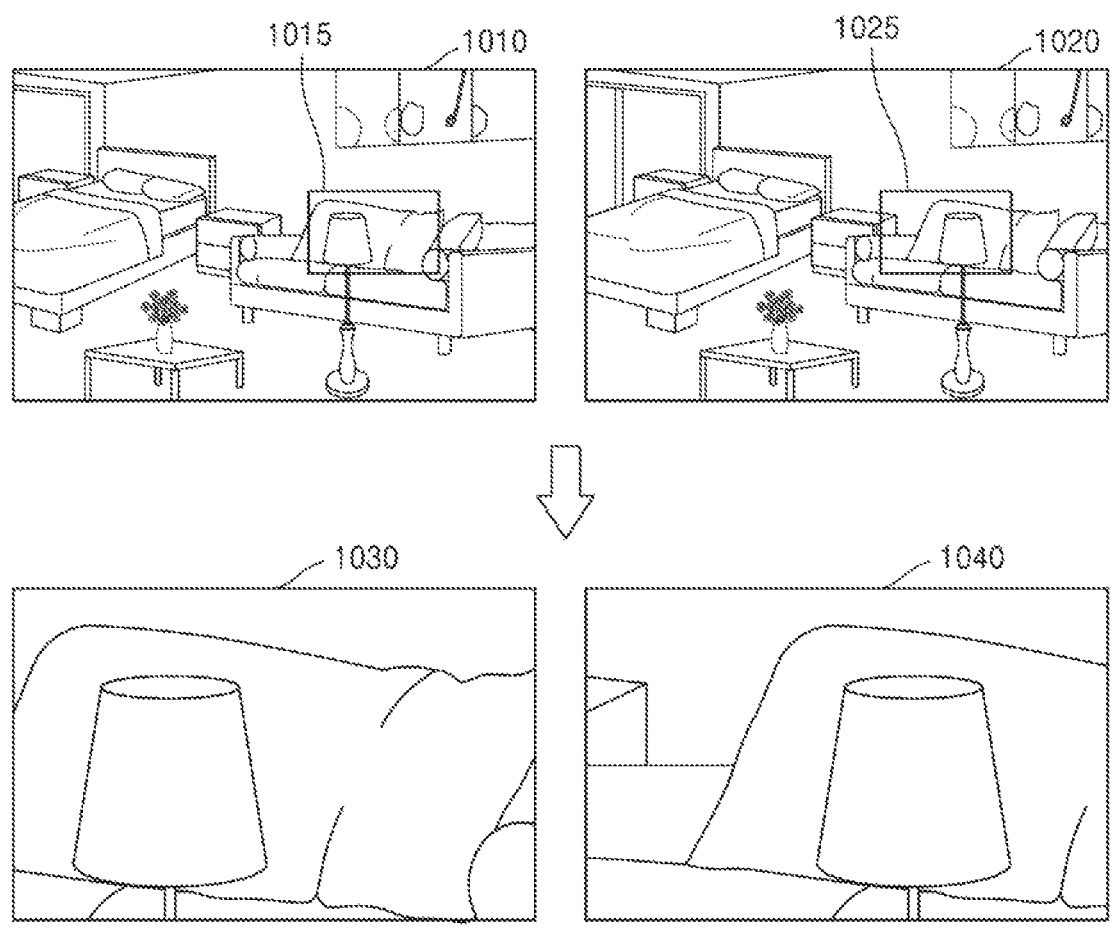
FIG. 10 is a reference diagram for describing a method performed by an electronic device to determine measurement parameters in the case of a depth sensor uses a stereo image (SI) method according to an embodiment of the disclosure.

FIG. 10 is a reference diagram for describing a method, performed by the electronic device 100, of determining measurement parameters when the depth sensor 150 uses a stereo image (SI) method according to an embodiment of the disclosure.

The depth sensor 150 according to an embodiment of the disclosure may include an SI depth sensor. The SI method refers to a method of capturing the cubic effect of an object by using two cameras. In this case, the depth sensor may include two cameras. The depth sensor may calculate depth information (distance) with respect to a specific object based on the principle of triangulation by using difference information of an image viewed by each camera. The human feels the cubic effect through a difference between images coming into the left eye and the right eye. The depth sensor measures the distance in a manner similar to the principle that the human eye feels the cubic effect. For example, when the depth is small (the distance is close), the difference between images captured by the two cameras is large, and when the depth is large (the distance is far), the difference between the images captured by the two cameras is small.

In case of the SI method, because two images need be processed simultaneously in real time, a fast processing performance of a processor is required and hardware processing is required. Therefore, it is difficult to process the SI method in real time using only a processor of a small device.

The SI depth sensor according to an embodiment of the disclosure may include a first camera and a second camera. At this time, the first camera and the second camera may capture a real space in different directions at different positions. For example, the first camera may capture the real space in a first direction at a first position to obtain a first image 1010, and the second camera may capture the real space in a second direction at a second position to obtain a second image 1020. In this case, when a difference image between the first image 1010 and the second image 1020 is used, depth information of a whole real space may be obtained.

Meanwhile, the electronic device 100 according to an embodiment of the disclosure may determine an ROI of the whole space by using eye information of both eyes of a user. The electronic device 100 may obtain the eye information of both eyes by using an eye tracking sensor, and may obtain 2D location information of a gaze point based on the eye information of both eyes. For example, when the gaze point of the user of the electronic device 100 is a first point, the electronic device 100 may determine a preset region with respect to the first point as the ROI. A first region 1015 of FIG. 10 represents a region corresponding to the ROI in the first image 1010, and a second region 1025 represents a region corresponding to the ROI in the second image 1020. Accordingly, the electronic device 100 may calculate depth information with respect to the ROI by calculating only the difference image between an image of the first region 1015 and images 1030 and 1040 of the second region 1025.

When the 2D location information of the gaze point is obtained based on the eye information of both eyes, the electronic device 100 according to an embodiment of the disclosure may determine the ROIs in the captured first and second images 1010 and 1020 based on the 2D location information of the gaze point and calculate the depth information with respect to only the ROIs. Alternatively, the electronic device 100 may enlarge and capture the ROIs by using a zoom function, obtain the images 1030 and 1040 with respect to the ROIs, and calculate the depth information with respect to the ROI. Accordingly, the calculation speed of the depth information may increase, and the power consumption may be reduced.

Figure 11:
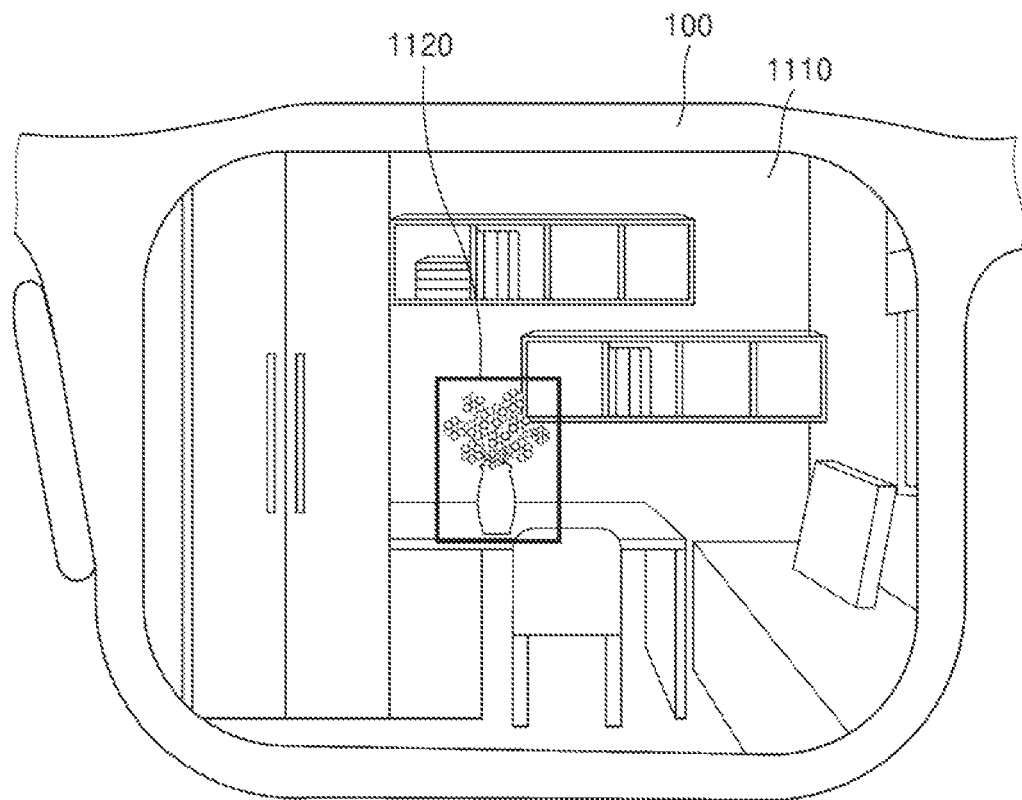
FIG. 11 is a diagram for describing a method performed by an electronic device to display a virtual object according to an embodiment of the disclosure.

FIG. 11 is a diagram for describing a method, performed by the electronic device 100, of displaying a virtual object 1120 according to an embodiment of the disclosure.

Referring to FIG. 11, the electronic device 100 according to an embodiment of the disclosure may display the virtual object 1120 on a display based on obtained depth information of a gaze point. For example, the electronic device 100 may display the virtual object 1120 in the form of augmented reality (AR). When displaying the virtual object in the form of AR, the electronic device 100 may display the virtual object 1120 on the display such that the virtual object 1120 overlaps a real space 1110 (a 2D or 3D space of the real world) observed through the display.

For example, the electronic device 100 may obtain depth information of a region around the gaze point (e.g., a region around a desk), and give a depth similar to the obtained depth information to the virtual object 1120 (e.g., a vase) such that a user recognizes the virtual object 1120 as being located in the region around the desk.

Figure 12:
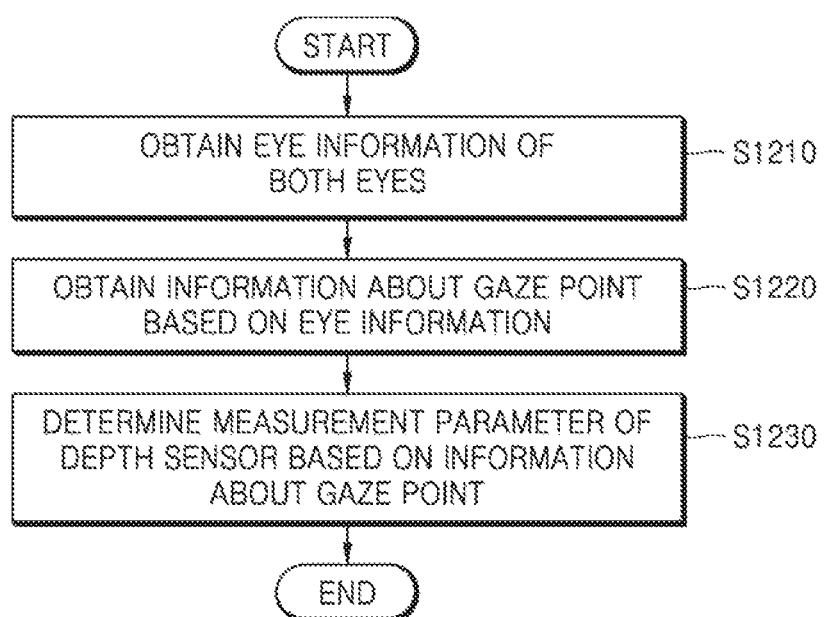
FIG. 12 is a flowchart of a method of operating an electronic device, according to an embodiment of the disclosure.

FIG. 12 is a flowchart of a method of operating the electronic device 100, according to an embodiment of the disclosure.

Referring to FIG. 12, the electronic device 100 according to an embodiment of the disclosure may obtain eye information of both eyes of a user (S1210).

The electronic device 100 according to an embodiment of the disclosure may provide light to a user's eye (the left eye and the right eye) using an eye tracking sensor, and may sense an amount of the light reflected from the user's eye. The electronic device 100 may determine the eye directions of both eyes based on the sensed amount of light.

Alternatively, the electronic device 100 may provide light to the user's eye using the eye tracking sensor and may capture the user's eye. In addition, the electronic device 100 may determine the eye directions of both eyes based on respective images of the captured eyes.

The electronic device 100 according to an embodiment of the disclosure may obtain a gaze point based on the eye information (S1220).

The electronic device 100 may obtain 2D coordinate information (x coordinate value and y coordinate value) with respect to a point at which a user gazes based on the eye direction of the user's right eye and the eye direction of the user's left eye. In addition, the electronic device 100 estimate a distance (z coordinate value) to the point at which the user gazes based on the eye direction of the user's right eye and the eye direction of the user's left eye. Accordingly, the electronic device 100 may obtain 2D location information and estimated depth information of the gaze point.

The electronic device 100 according to an embodiment of the disclosure may determine measurement parameters of a depth sensor based on information about the gaze point (S1230).

The measurement parameters of the depth sensor may include at least one of a parameter with respect to a target region, a parameter with respect to the output of an emission light (the output pattern of the emission light and the magnitude of the output of the emission light), or a parameter with respect to sensing of a reflection light. For example, the electronic device 100 may determine the parameter with respect to the target region by using the 2D location information of the gaze point, and may determine the parameter with respect to the output of the emission light (the output pattern of the emission light and the magnitude of the output of the emission light) and the parameter with respect to sensing of the reflection light by using the estimated depth information of the gaze point. This is described in detail with reference to FIGS. 5A to 10, and thus a detailed description thereof will be omitted.

The electronic device 100 according to an embodiment of the disclosure may obtain depth information about at least one object included in a preset ROI with respect to the gaze point based on the determined measurement parameter.

Figure 13:
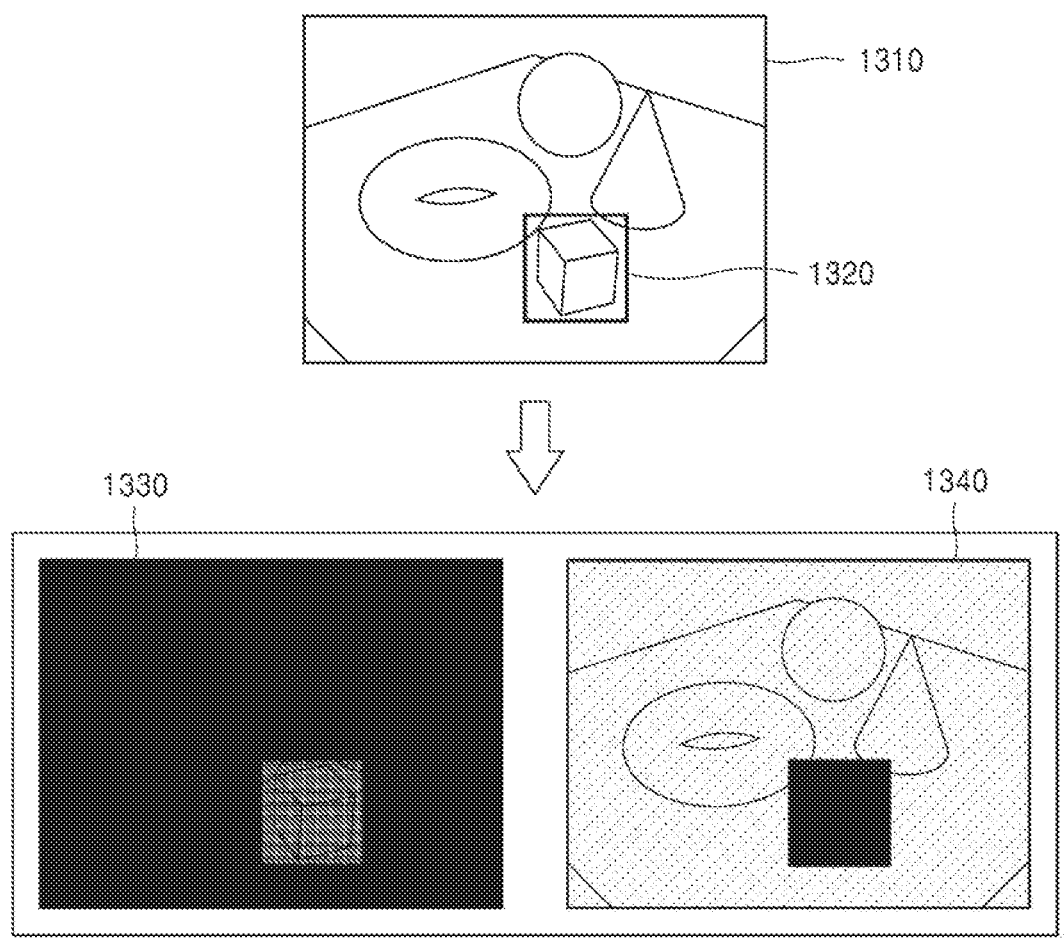
FIG. 13 is a diagram for describing a method performed by an electronic device to obtain depth information according to an embodiment of the disclosure.

FIG. 13 is a diagram for describing a method, performed by the electronic device 100, of obtaining depth information 1330 and 1340 according to an embodiment of the disclosure.

A depth sensor according to an embodiment of the disclosure may include at least one camera and obtain depth information about a real space 1310 included in a field of view (FOV) of the camera included in the depth sensor. Hereinafter, a space of a range that the depth sensor is capable of sensing (the real space 1310) will be referred to as a "whole space."

As shown in FIG. 13, the electronic device 100 according to an embodiment of the disclosure may determine an ROI 1320 of the whole space 1310.

For example, as described with reference to FIGS. 2 to 3D, the electronic device 100 may obtain the eye information of both eyes of a user by using an eye tracking sensor and obtain a gaze point of a user based on the eye information of both eyes. In addition, a region previously set with respect to the gaze point may be determined as the ROI 1320 based on the obtained gaze point. Alternatively, the electronic device 100 may obtain an image of the whole space 1310 and recognize a main object (e.g., a person, a face, a hand, etc.) within the determined ROI 1320 using object recognition technology, thereby determining the recognized main object as the ROI 1320 other than the region previously set with respect to the gaze point.

When the ROI 1320 is determined, the electronic device 100 may obtain depth information using different measurement parameters with respect to the ROI 1320 and the remaining space excluding the ROI 1320.

For example, the electronic device 100 may set the measurement parameter of the depth sensor as a first parameter to obtain the depth information 1330 about the ROI. At this time, the electronic device 100 may set the first parameter based on the information of the gaze point. For example, the electronic device 100 may set the region previously set with respect to the gaze point as the ROI 1320 based on the 2D location information of the gaze point and set a light emission region, a light sensing region, etc. to correspond to the set ROI 1320. In addition, the electronic device 100 may set a pattern of emitted light or light output based on the estimated depth information of the gaze point.

For example, when the depth sensor is a TOF depth sensor, a sensor unit may sense signals corresponding to the ROI by increasing a sampling rate or reducing a sampling cycle and may not sense signals corresponding to the remaining region, thereby obtaining high resolution depth information about the ROI.

In addition, the electronic device 100 may set the measurement parameter of the depth sensor as a second parameter to obtain the depth information 1340 about the remaining regions excluding the ROI 1320. For example, when the depth sensor is the TOF depth sensor, the sensor unit sensor unit may sense signals corresponding to the remaining region by reducing a sampling rate or increasing a sampling cycle and may not sense signals corresponding to the ROI, thereby obtaining low resolution depth information about the ROI.

Alternatively, the electronic device 100 may obtain low resolution depth information about the whole space 1310 including the ROI.

Accordingly, the electronic device 100 may obtain highly accurate depth information (high resolution depth information) about the ROI, and also obtain approximate depth information (low resolution depth information) about the remaining region (a region around the gaze point).

Figure 14:
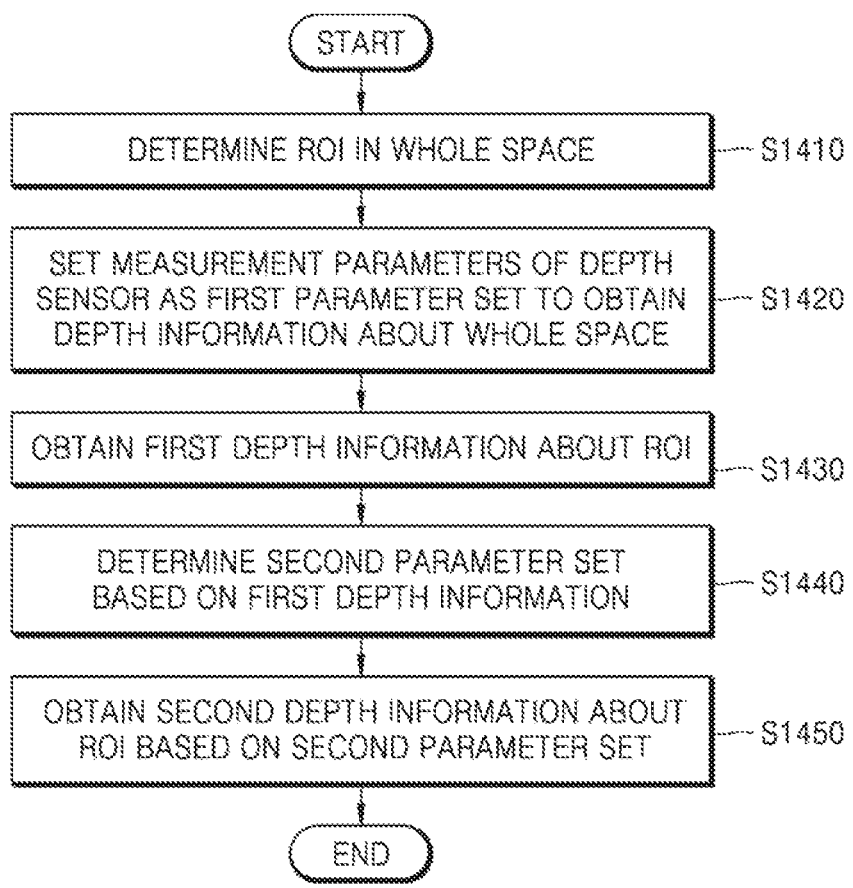
FIG. 14 is a flowchart illustrating a method performed by an electronic device to obtain depth information according to an embodiment of the disclosure.

FIG. 14 is a flowchart illustrating a method, performed by the electronic device 100, of obtaining depth information according to an embodiment of the disclosure.

Referring to FIG. 14, the electronic device 100 according to an embodiment of the disclosure may determine an ROI in a whole space (S1410). A method of determining the ROI is described in detail with reference to FIG. 13, and thus a detailed description thereof will be omitted.

The electronic device 100 may set measurement parameters of a depth sensor as a first parameter set to obtain depth information about the whole space (S1420).

For example, the electronic device 100 may obtain low resolution depth information about the whole space.

The electronic device 100 may obtain first depth information about the ROI based on the depth information about the whole space (S1430).

For example, the electronic device 100 may determine the depth information about the ROI included in the depth information about the whole space as first depth information.

The electronic device 100 may determine a second parameter set based on the first depth information (S1440). For example, the electronic device 100 may determine a parameter with respect to the output of an emission light (the output pattern of the emission light and the magnitude of the output of the emission light) of a depth sensor, or a parameter with respect to sensing of a reflection light based on the first depth information of the ROI.

The electronic device 100 may obtain second depth information about the ROI by using the depth sensor having a measurement parameter set to the second parameter set (S1450). At this time, the second depth information may be high resolution depth information and may be depth information having greater accuracy than an accuracy of the low resolution depth information obtained in S1420.

Figure 15:
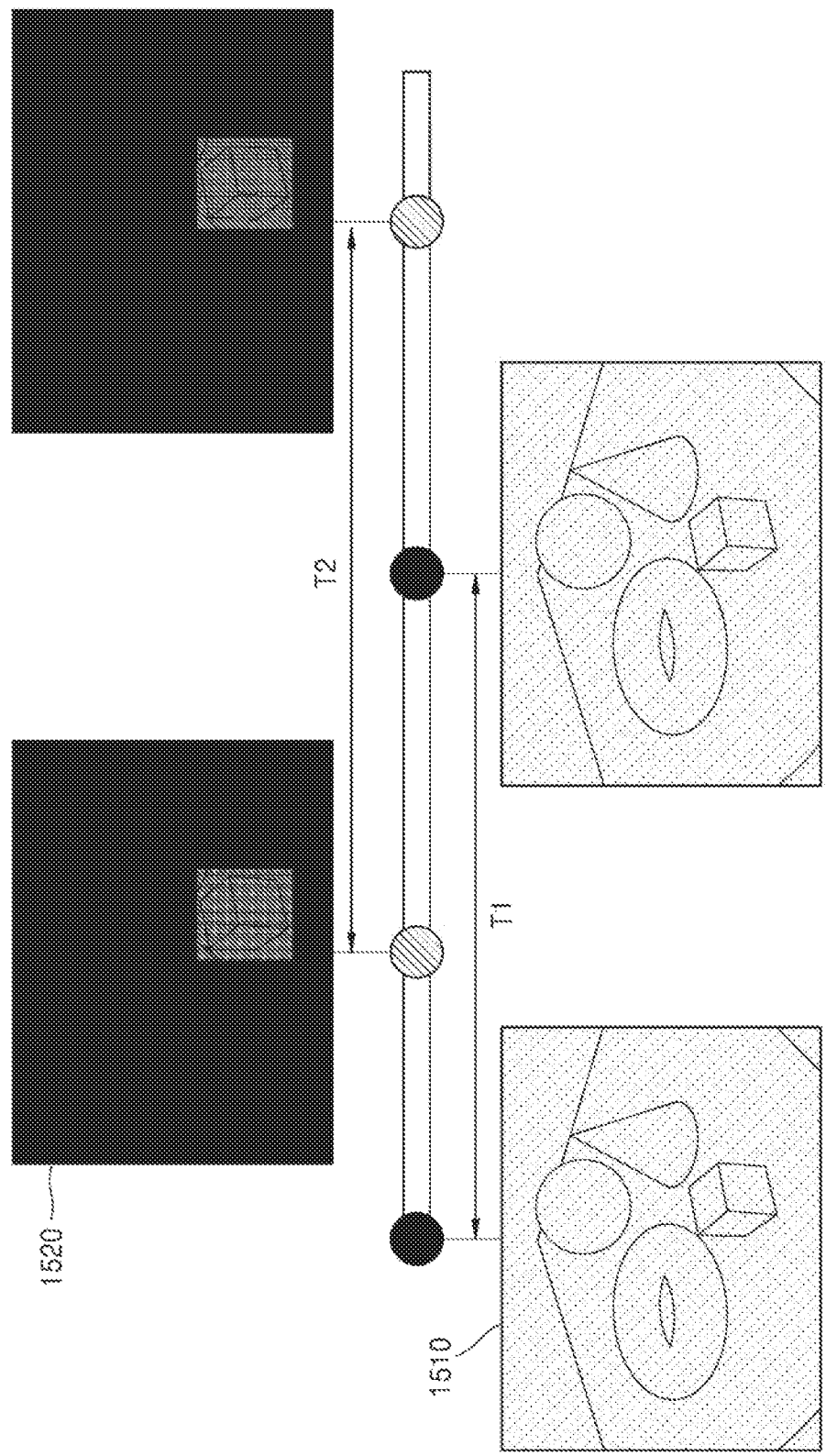
FIG. 15 is a diagram illustrating an example in which an electronic device repeatedly performs operations of obtaining depth information of FIG. 14 according to an embodiment of the disclosure.

FIG. 15 is a diagram illustrating an example in which the electronic device 100 repeatedly performs operations of obtaining depth information of FIG. 14 according to an embodiment of the disclosure.

Referring to FIG. 15, the electronic device 100 according to an embodiment of the disclosure may repeatedly perform an operation (S1420) of obtaining depth information 1510 (low resolution depth information) about a whole space and an operation (S1450) of obtaining second depth information 1520 (high resolution depth information) about an ROI at a regular period in an alternating fashion.

For example, the electronic device 100 may set a first period T1 for obtaining the depth information 1510 about the whole space and a second period T2 for obtaining the second depth information 1520 about the ROI. At this time, the electronic device 100 may adjust the first period T1 according to the movement of the electronic device 100 to adjust the update period of depth information of the remaining region excluding the ROI. That is, the electronic device 100 may adjust the first period T1 according to an amount of change in the movement of the remaining region excluding the ROI in an image generated by the movement of the electronic device 100. For example, when the movement of the electronic device 100 is small (when the electronic device 100 is static), the electronic device 100 may increase the first period T1. Conversely, and when the movement of the electronic device 100 is large (when the electronic device 100 is dynamic), the electronic device 100 may reduce a second period T2.

In addition, the electronic device 100 may adjust the second period T2 according to a minimum time required for interaction between a user of the electronic device 100 and a virtual object displayed on a gaze point. For example, the electronic device 100 may set the second period T2 to be equal to or shorter than a minimum time required for updating depth information about a hand for interaction such as a hand gesture recognition, but is not limited thereto.

Figure 16:
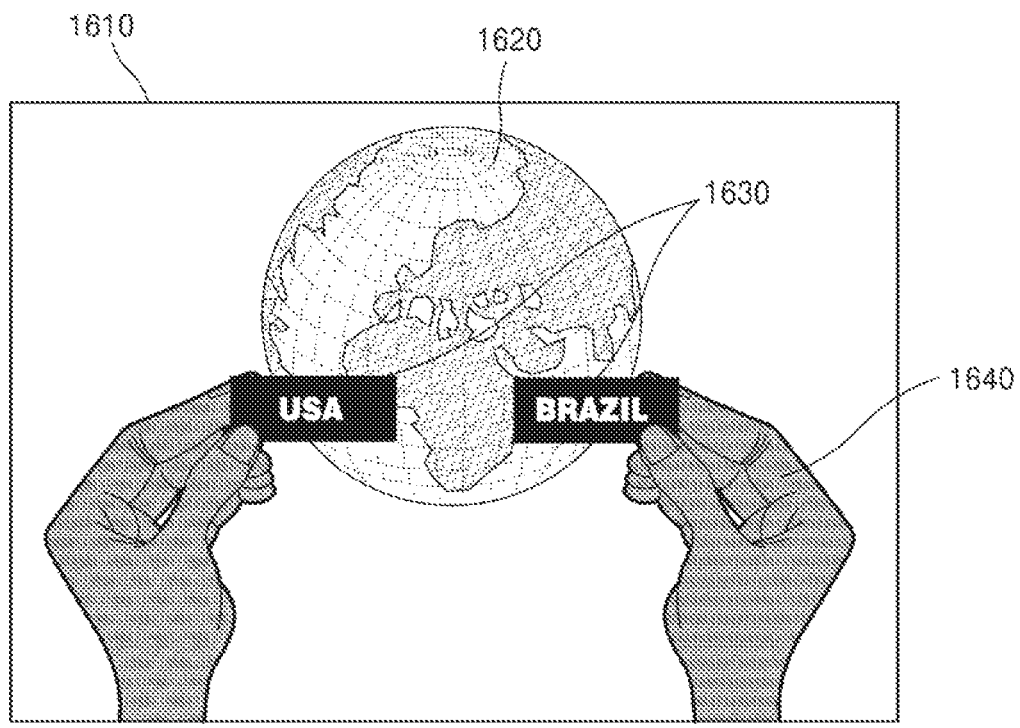
FIG. 16 is a diagram illustrating an example in which an electronic device provides a virtual object using an augmented reality (AR) method according to an embodiment of the disclosure.

FIG. 16 is a diagram illustrating an example in which the electronic device 100 provides a virtual object 1630 using an AR method according to an embodiment of the disclosure.

Referring to FIG. 16, the electronic device 100 according to an embodiment of the disclosure may include at least one camera (an image sensor). For example, the at least one camera may be a depth camera included in a depth sensor or a camera provided separately from the depth sensor.

The at least one camera may obtain an image 1610 corresponding to a space included in a FOV of the camera. The electronic device 100 may detect a main object from the obtained image 1610. For example, the electronic device 100 may display the virtual object 1630 using the AR method such that a user recognizes the virtual object 1630 as being located near a real object 1620. In addition, when a user of the electronic device 100 interacts with the virtual object 1630 by using a hand, the main object may be a user's hand 1640.

The electronic device 100 may detect a region of the hand 1640 from the obtained image 1610, determine the region of the hand 1640 as an ROI, and determine the remaining region excluding the region of the hand 1640 as a background region.

The electronic device 100 may obtain high resolution depth information about the ROI and low resolution depth information about the background region. For example, the electronic device 100 may set the measurement parameter of the depth sensor to obtain depth information with high accuracy with respect to the region of the hand 1640, thereby obtaining high resolution depth information. Meanwhile, the electronic device 100 may set the measurement parameter of the depth sensor to obtain depth information with low accuracy with respect to the background region, thereby obtaining low resolution depth information.

The electronic device 100 may estimate a pose of the hand 1640 or recognize a gesture of the hand 1640 using the high resolution depth information of the region of the hand 1640. Meanwhile, the electronic device 100 may perform camera pose tracking or background modeling using the low resolution depth information about the background region, but the configuration is not limited thereto.

Figure 17:
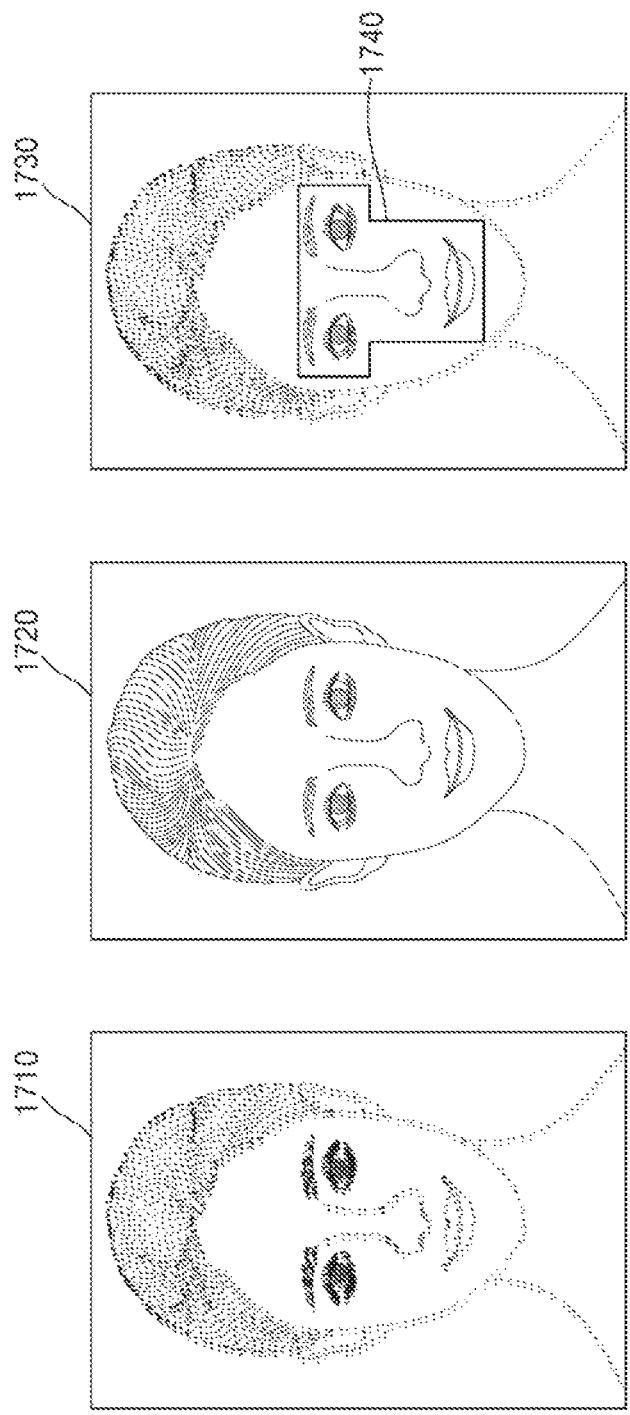
FIG. 17 is a diagram illustrating an example in which an electronic device recognizes a face of a person using depth information according to an embodiment of the disclosure.

FIG. 17 is a diagram illustrating an example in which the electronic device 100 recognizes a face of a person using depth information according to an embodiment of the disclosure.

Referring to FIG. 17, the electronic device 100 according to an embodiment of the disclosure may include at least one camera. For example, the at least one camera may be a depth camera included in a depth sensor or a camera provided separately from the depth sensor. The at least one camera may obtain an image including a face.

The electronic device 100 may detect a main feature region from the obtained face image. For example, in the face of the person, eyes, nose, and mouth regions may be important regions to distinguish from other people. The the electronic device 100 may detect the eyes, nose, and mouth regions from the face image. The electronic device 100 according to an embodiment of the disclosure may obtain high resolution depth information with respect to the eyes, nose, and mouth regions 1740 of the face and low resolution depth information with respect to the remaining region.

A first depth image 1710 of FIG. 17 represents the low resolution depth information obtained with respect to a whole face region, and a second depth image 1720 represents the high resolution depth information obtained with respect to the whole face region. Also, a third depth image 1730 represents high resolution depth information with respect to the eyes, nose, and mouth regions 1740 and low resolution depth information with respect to the remaining region obtained by the electronic device 100.

When the electronic device 100 performs face recognition (identity recognition) using the third depth image 1730 according to an embodiment of the disclosure, recognition performance (recognition accuracy) may be improved compared to when the electronic device 100 performs face recognition using the first depth image 1710. Further, and a recognition speed may increase compared to when the electronic device 100 performs face recognition using the second depth image 1720. In addition, when recognizing a face of a person at a long distance, the electronic device 100 may increase the resolution of the main feature region to obtain a depth image, thereby improving the recognition performance.

Figure 18:
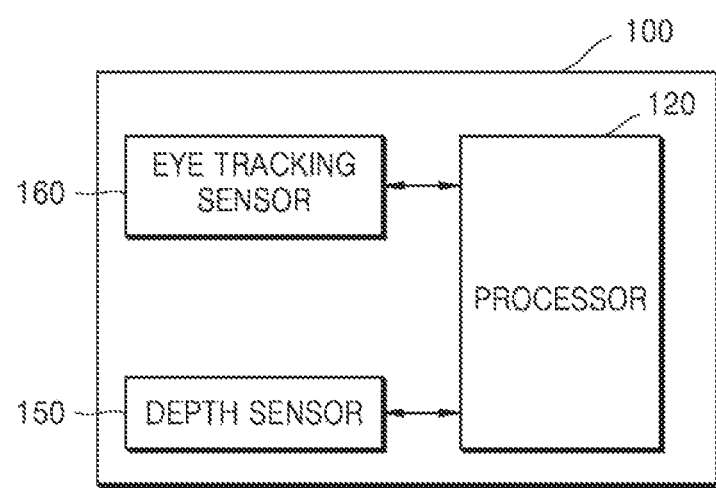
FIG. 18 is a block diagram illustrating a configuration of an electronic device according to an embodiment of the disclosure.

FIG. 18 is a block diagram illustrating a configuration of the electronic device 100 according to an embodiment of the disclosure.

Referring to FIG. 18, the electronic device 100 according to an embodiment of the disclosure may include the eye tracking sensor 160, the depth sensor 150, and the processor 120.

The eye tracking sensor 160 according to an embodiment of the disclosure may include an illuminator that provides light to a user's eye and a detector that detects light. The illuminator may include a light source that provides light and a scanning mirror that controls a direction of the light provided from the light source. The scanning mirror may control the direction to direct the light provided from the light source toward the user's eye (e.g., a cornea). The detector may detect the light reflected from the user's eye and measure an amount of the detected light. The eye tracking sensor 160 may track the both eyes of the user based on the measured amount of light.

Alternatively, the eye tracking sensor 160 according to an embodiment of the disclosure may include the illuminator and a capturer. The illuminator may include an infrared light emitting diode (IR LED) and provide light (e.g., an infrared light) to the user's eye when the user's eye is captured. Because the light is provided to the user's eye, the reflection light may be generated in the user's eye. In addition, the capturer may include at least one camera. At this time, the at least one camera may include an infrared camera IR. The capturer may capture the user's eye. The eye tracking sensor 160 may track the eyes of the user based on an eye image of the user.

The depth sensor 150 according to an embodiment of the disclosure may obtain depth information about one or more objects included in the real world. The depth information may correspond to a distance from the depth sensor 150 to a specific object. The greater the distance from the depth sensor 150 to the specific object, the greater the depth value. The depth sensor 150 according to an embodiment of the disclosure may obtain depth information of an object in various ways. For example, the depth sensor 150 may obtain the depth information using at least one of a TOF method, a SI method, or a SL method.

The depth sensor 150 according to an embodiment of the disclosure may include at least one camera and obtain depth information about an actual space included in a FOV of the camera included therein.

The processor 120 according to an embodiment of the disclosure may generally control the electronic device 100. The processor 120 according to an embodiment of the disclosure may execute one or more programs stored in a memory.

The memory according to an embodiment of the disclosure may store various data, programs or applications for driving and controlling the electronic device 100. The program stored in the memory may include one or more instructions. The program (one or more instructions) or application stored in the memory may be executed by the processor 120.

The processor 120 according to an embodiment of the disclosure may obtain information about a gaze point based on the eye information of the user obtained by the eye tracking sensor 160. For example, the processor 120 may obtain 2D coordinate information (x coordinate value and y coordinate value) with respect to a point at which a user gazes based on the eye direction of the user's right eye and the eye direction of the user's left eye. In addition, the processor 120 may estimate a distance (z coordinate value) to the point at which the user gazes based on the eye direction of the user's right eye and the eye direction of the user's left eye. Accordingly, the processor 120 may obtain 2D location information and estimated depth information of the gaze point.

The processor 120 according to an embodiment of the disclosure may set a region previously set with respect to the gaze point as an ROI based on the information of the gaze point and obtain depth information about at least one object included in the ROI. For example, the processor 120 may determine the measurement parameters of the depth sensor 150 based on the information about the gaze point. The measurement parameters of the depth sensor 150 may include a parameter with respect to a target region, a parameter with respect to the pattern of an emission light, a parameter with respect to the output of the emission light, etc. For example, the processor 120 may determine the parameter with respect to the target region using the 2D location information of the gaze point, and determine the parameter with respect to the pattern of the emission light and the parameter with respect to the output of the emission light using the estimated depth information of the gaze point.

This is described in detail with reference to FIGS. 5 to 10, and thus a detailed description thereof will be omitted. The processor 120 may obtain depth information about at least one object included in the ROI, based on the determined measurement parameters.

The processor 120 according to an embodiment of the disclosure may set the measurement parameters of the depth sensor 150 as a first parameter set to obtain low resolution depth information about a whole space. In addition, the processor 120 may determine a second parameter set based on the depth information about the ROI included in the low resolution depth information. The processor 120 may set the measurement parameter of the depth sensor 150 as the second parameter set to obtain high resolution depth information about the ROI.

Figure 19:
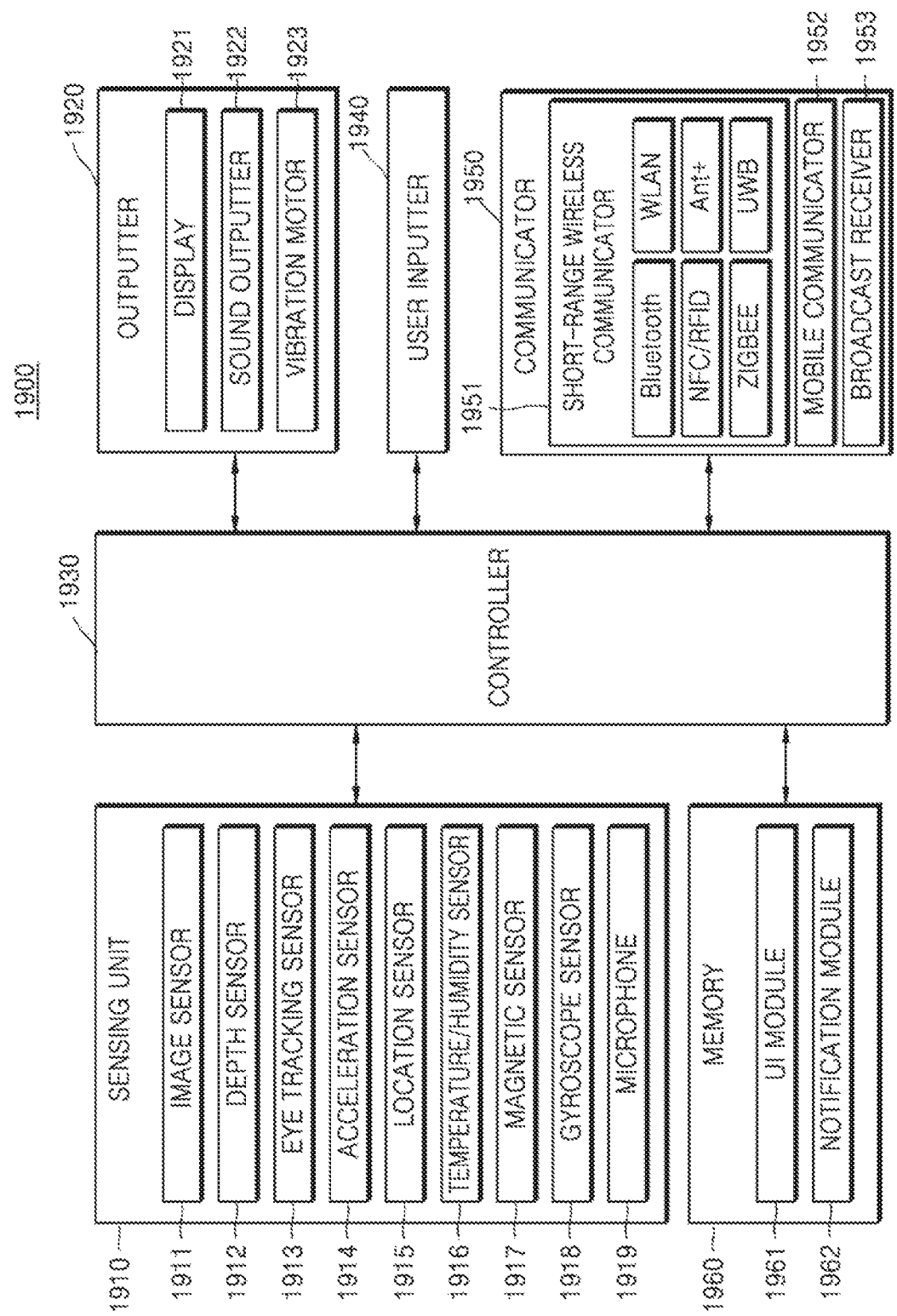
FIG. 19 is a block diagram illustrating a configuration of an electronic device according to another embodiment of the disclosure.

FIG. 19 is a block diagram illustrating a configuration of an electronic device 1900 according to another embodiment of the disclosure. The electronic device 1900 of FIG. 19 may be an embodiment of the electronic device 100 of FIG. 18.

Referring to FIG. 19, the electronic device 1900 according to an embodiment of the disclosure may include a sensing unit 1910, a memory 1960, a controller 1930, an outputter 1920, a user inputter 1940, and a communicator 1950.

The controller 1930 and the memory 1960 of FIG. 19 respectively correspond to the processor 120 and the memory 130 of FIG. 18, and thus the same descriptions thereof will be omitted.

The sensing unit 1910 may sense a state of the electronic device 1900 or a state around the electronic device 1900 and may transmit sensed information to the controller 1930.

The sensing unit 1910 may include at least one of an image sensor 1911, a depth sensor 1912, an eye tracking sensor 1913, an acceleration sensor 1914, a location sensor (e.g. a global positioning system (GPS)) 1915, a temperature/humidity sensor 1916, a magnetic sensor 1917, a gyroscope sensor 1918, or a microphone 1919, but the sensing unit 1910 is not limited thereto.

The image sensor 1911 according to an embodiment of the disclosure may obtain an image frame such as a still image or a moving image. For example, the image sensor 1911 may capture an image of the outside of the electronic device 1900. At this time, the image captured by the image sensor 1911 may be processed by the controller 1930 or a separate image processor (not shown).

The depth sensor 1912 and the eye tracking sensor 1913 of FIG. 19 respectively correspond to the depth sensor 150 and the eye tracking sensor 160 of FIG. 18, and thus the same descriptions thereof will be omitted.

The microphone 1919 may receive an external sound signal and process the received signal as electrical speech data. For example, the microphone 1919 may receive a sound signal from an external device or a speaker. The microphone 1919 may use various noise reduction algorithms for eliminating noise generated in a process of receiving an external sound signal.

Functions of the acceleration sensor 1914, the location sensor 1915, the temperature/humidity sensor 1916, the magnetic sensor 1917, and the gyroscope sensor 1918 will be understood by the artisan of ordinary skill and thus, detailed descriptions thereof will be omitted.

The outputter 1920 may be an output interface to output an audio signal or a video signal or a vibration signal. The outputtter 1920 may include a display 1921, a sound outputter 1922, a vibration motor 1923, etc.

The display 1921 may display and output information processed by the electronic device 1900. For example, the display 1921 may display a virtual object.

According to an embodiment of the disclosure, the display 1921 may be a transparent display or an opaque display. The transparent display refers to an information display device in which a backside of a screen displaying information is reflected. The transparent display may include a transparent device, and may adjust light transmittance with respect to the transparent device to adjust transparency or adjust an RGB value of each pixel to adjust transparency.

The sound outputter 1922 may output audio data received from the communicator 1950 or stored in the memory 1960.

Also, the sound outputter 1922 may output a sound signal related to functions (e.g., call signal reception sound, message reception sound, and alarm sound) performed by the electronic device 1900. The sound outputter 1922 may include a speaker, a buzzer, etc.

According to an embodiment of the disclosure, when an input is generated through a virtual input interface, the sound outputter 1922 may output an audio signal corresponding to the generated input.

The vibration motor 1923 may output a vibration signal. For example, the vibration motor 1923 may output a vibration signal corresponding to an output of audio data or video data (e.g., call signal reception sound, message reception sound, etc.) Also, the vibration motor 1923 may output the vibration signal when an input is generated through the virtual object.

The user inputter 1940 may be a user input interface for a user to input data for controlling the electronic device 1900. For example, the user inputter 1940 may include a key pad, a dome switch, a touch pad (a contact capacitance type, a pressure resistive type, an infrared ray detection type, a surface ultrasonic wave conduction type, an integral tension measurement type, a piezo effect type, etc.), a jog wheel, a jog switch, and the like, but is not limited thereto. According to an embodiment of the disclosure, the user inputter 1940 may include a virtual input interface.

The communicator 1950 may be a communication interface that includes one or more elements for communication between the electronic device 1900 and an external device or between the electronic device 1900 and a server. For example, the communicator 1950 may include a short-range wireless communicator 1951, a mobile communicator 1952, and a broadcast receiver 1953.

The short-range wireless communicator 1951 may include a Bluetooth communicator, a near field communicator (NFC/RFID), a WLAN (WiFi) communicator, a Zigbee communicator, an infrared data association (IrDA) communicator, an ultra wideband (UWB) communicator, an Ant+ communicator, etc., but the wireless communication is not limited thereto.

For example, the communicator 1950 may transmit eye information (2D location information and estimated depth information of the gaze point) of a user obtained by the eye tracking sensor 1913 to an external device and may receive measurement parameters of the depth sensor 1912 corresponding to the eye information of the user from the external device.

The mobile communicator 1952 may transmit and receive a radio signal to and from at least one of a base station, an external terminal, or a server on a mobile communication network. Here, the radio signal may include various types of data according to a speech call signal, a video call signal, or a text/multimedia message transmission/reception.

The broadcast receiver 1953 may receive a broadcast signal and/or broadcast-related information from outside through a broadcast channel. The broadcast channel may include a satellite channel and a terrestrial channel. The electronic device 1900 may not include the broadcast receiver 1953 according to an implementation example.

The memory 1960 may store program for processing and controlling the controller 1930 and store input/output data (e.g., gesture information corresponding to an input mode, a virtual input interface, data input through the virtual input interface, sensing information measured by a sensor, content, etc.).

The memory 1960 according to an embodiment of the disclosure may store the matching table 750 illustrated in FIG. 7B. Alternatively, the memory 1960 may store equations, algorithms, etc. for calculating the measurement parameters of the depth sensor 1912 based on the eye information according to an embodiment of the disclosure.

For example, the matching table 750 may be stored in a read only memory (ROM). When driving the depth sensor, the controller 1930 may load the matching table 750 stored in the ROM onto a random access memory (RAM) and determine measurement parameters matching the eye information by using the loaded matching table 750.

The controller 1930 may output the determined measurement parameters to the depth sensor 1912 to control the depth sensor 1912 to obtain depth information using the determined measurement parameters.

The memory 1960 may include at least one type storage medium of a flash memory type, a hard disk type, a multimedia card micro type, a card type memory (e.g., SD or XD memory, etc.), random access memory (RAM), static random access memory (SRAM), read only memory (ROM), electrically erasable programmable read-only memory (EEPROM), programmable read-only memory (PROM), a magnetic memory, a magnetic disk, or an optical disk. In addition, the electronic device 1900 may operate a web storage or a cloud server on the Internet that performs a storage function of the memory 1960. The programs stored in the memory 1960 may be classified into a plurality of modules depending on a function thereof, e.g., a user interface (UI) module 1961, a notification module 1962, etc.

The UI module 1961 may provide a specialized UI or graphical UI (GUI) interworking with the electronic device 1900 for each application. In addition, according to an embodiment of the disclosure, the UI module 1961 may select and provide a virtual input interface suitable for a situation.

The notification module 1962 may generate a signal for notifying that an event of the electronic device 1900 has occurred. Examples of the event occurring in the electronic device 1900 may include call signal reception, message reception, key signal input through the virtual input interface, schedule notification, etc. The notification module 1962 may output a notification signal as a video signal through the display 1921, an audio signal through the sound outputter 1922, and/or a vibration signal through the vibration motor 1923. In addition, the notification module 1962 may output a haptic signal using an external device.

Meanwhile, the block diagrams of the electronic devices 100 and 1900 shown in FIGS. 18 and 19 are block diagrams for an embodiment of the disclosure. Each element of the block diagrams may be integrated, added, or omitted, according to the specifications of the actual implementation of the image electronic devices 100 and 1900. That is, two or more elements may be combined into one element, or one element may be subdivided into two or more elements when necessary. Furthermore, a function performed in each block is for the purpose of explaining the embodiment of the disclosure, and a specific operation or device thereof does not limit the scope of the disclosure.

Figure 20:
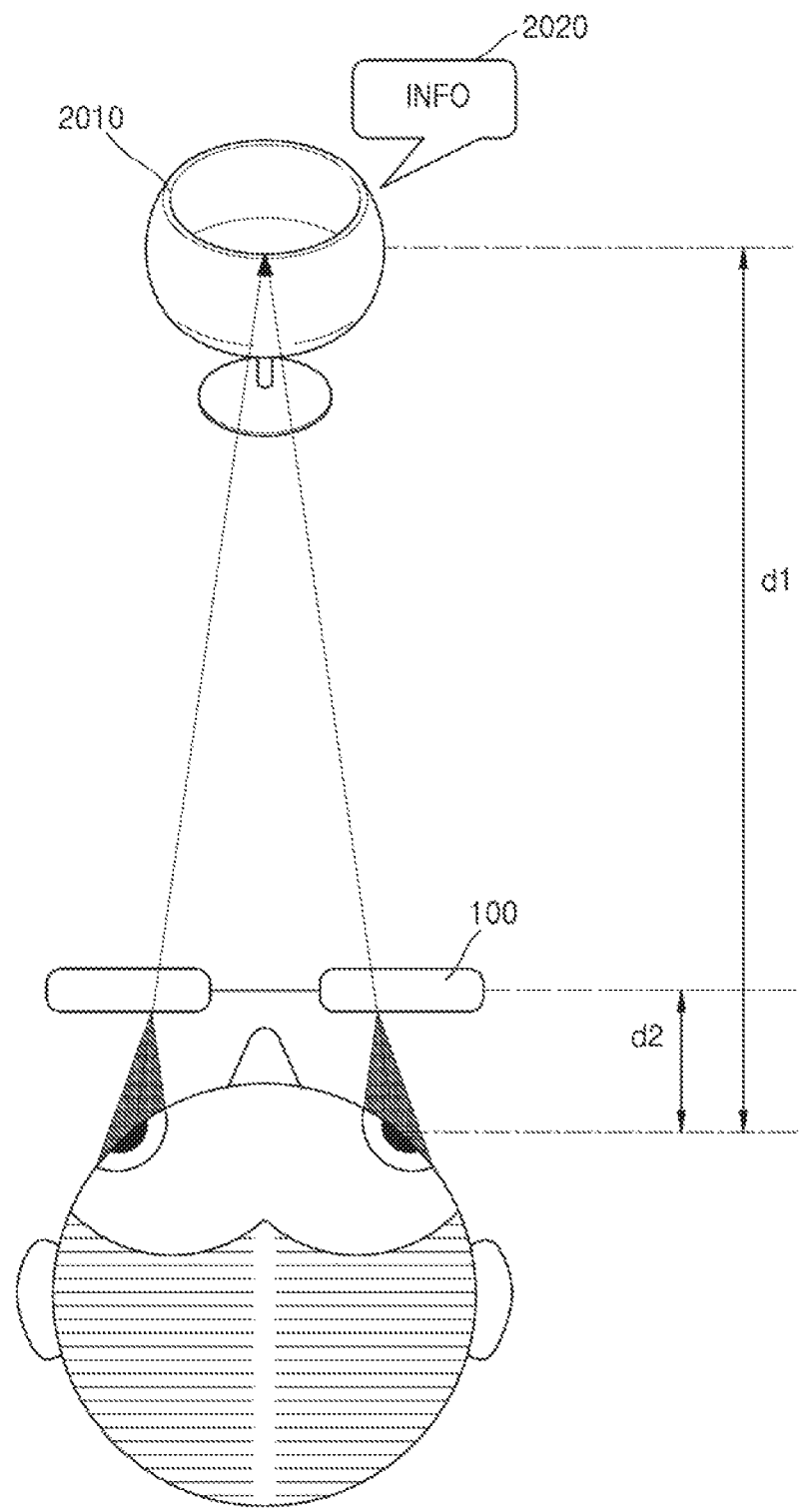
FIGS. 20 and 21 are diagrams for describing a method performed by an electronic device to automatically adjust a focus according to an embodiment of the disclosure.
Figure 21:
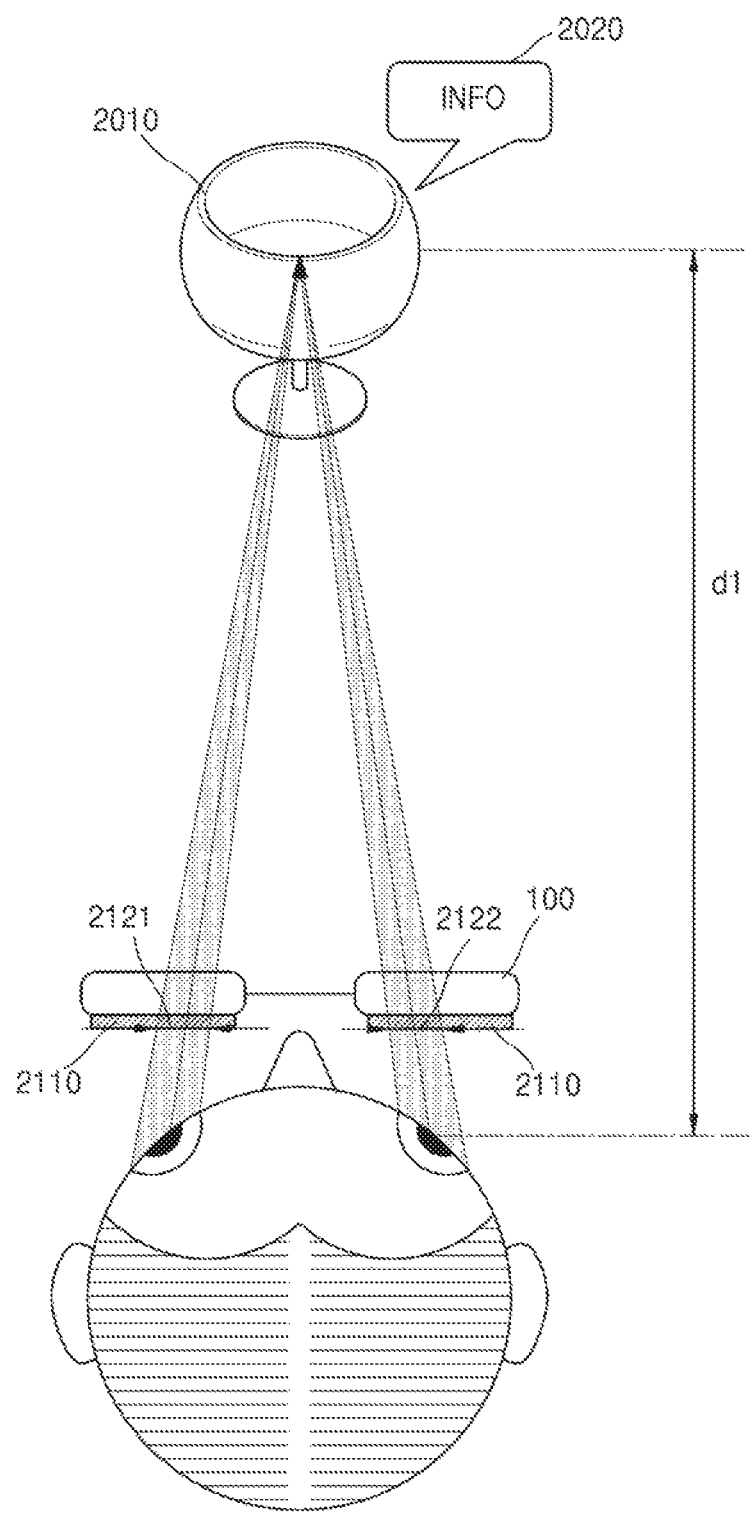

FIGS. 20 and 21 are diagrams for describing a method, performed by electronic device 100, of automatically adjusting a focus according to an embodiment of the disclosure.

Referring to FIG. 20, when the electronic device 100 according to an embodiment of the disclosure displays a virtual object 2020 as being located around a real object 2010, a user may experience a vergence-accommodation conflict. For example, when a distance from the electronic device 100 to the real object 2010 is d1, the electronic device 100 may display the virtual object 2020 as being located at the distance d1. At this time, because the user sees the virtual object 2020 as being located at the distance d1, the vergence distance of both eyes of the user is d1. Meanwhile, because the virtual object 2020 is actually displayed on the display of the electronic device 100, the focal distance of both eyes may be a distance d2 from the user's eyes to the display. In this case, the vergence distance and the focal distance may be inconsistent, and when the electronic device 100 is used for a long time, the user may feel faint, dizzy, and motion sick.

Therefore, to alleviate a vergence-accommodation conflict, the electronic device 100 according to an embodiment of the disclosure may adjust a focal length.

Referring to FIG. 21, according to an embodiment of the disclosure, the electronic device 100 may include a focus adjustment lens 2110. The focus adjustment lens 2110 may refer to an optical device capable of adjusting optical characteristics such as a focal length or an optical axis position, but is not limited thereto. For example, the focus adjustment lens 2110 may locally vary the effective refractive index according to the applied voltage. Liquid crystals may be generally used for the focus adjustment lens 2110, but the adjustment configuration is not limited thereto.

The electronic device 100 according to an embodiment of the disclosure may obtain eye information of a user using an eye tracking sensor, and based on the eye information of the user, obtain information about a gaze point (e.g., the real object 2010), and based on the information about the gaze point, obtain depth information about the gaze point. This is described in detail in FIGS. 1 to 19, and thus a description thereof will be omitted.

In addition, the electronic device 100 may display the virtual object 2020 based on the depth information about the real object 2010. For example, the electronic device 100 may display the virtual object 2020 on the display such that the user recognizes the virtual object 2020 as being located around the real object 2010 observed through the display.

The electronic device 100 according to an embodiment of the disclosure may adjust the focal length based on depth information of the real object 2010 (or depth information of the virtual object 2020). For example, when the distance to the real object 2010 is d1, the electronic device 100 may adjust the focal length of the user's eye to d1 using the focus adjustment lens 2110. At this time, the electronic device 100 may obtain information about a first region 2121 and a second region 2122 through which the user's eyes pass among the whole region of the focus adjustment lens 2110 based on the eye information of the user. The electronic device 100 may change the refractive index such that the focal length of the first region 2121 and the second region 2122 is d1 by adjusting the voltage applied to the focus adjustment lens 2110. Accordingly, the vergence distance and the focal distance may be consistent, and the vergence-accommodation conflict may be prevented.

Figure 22:
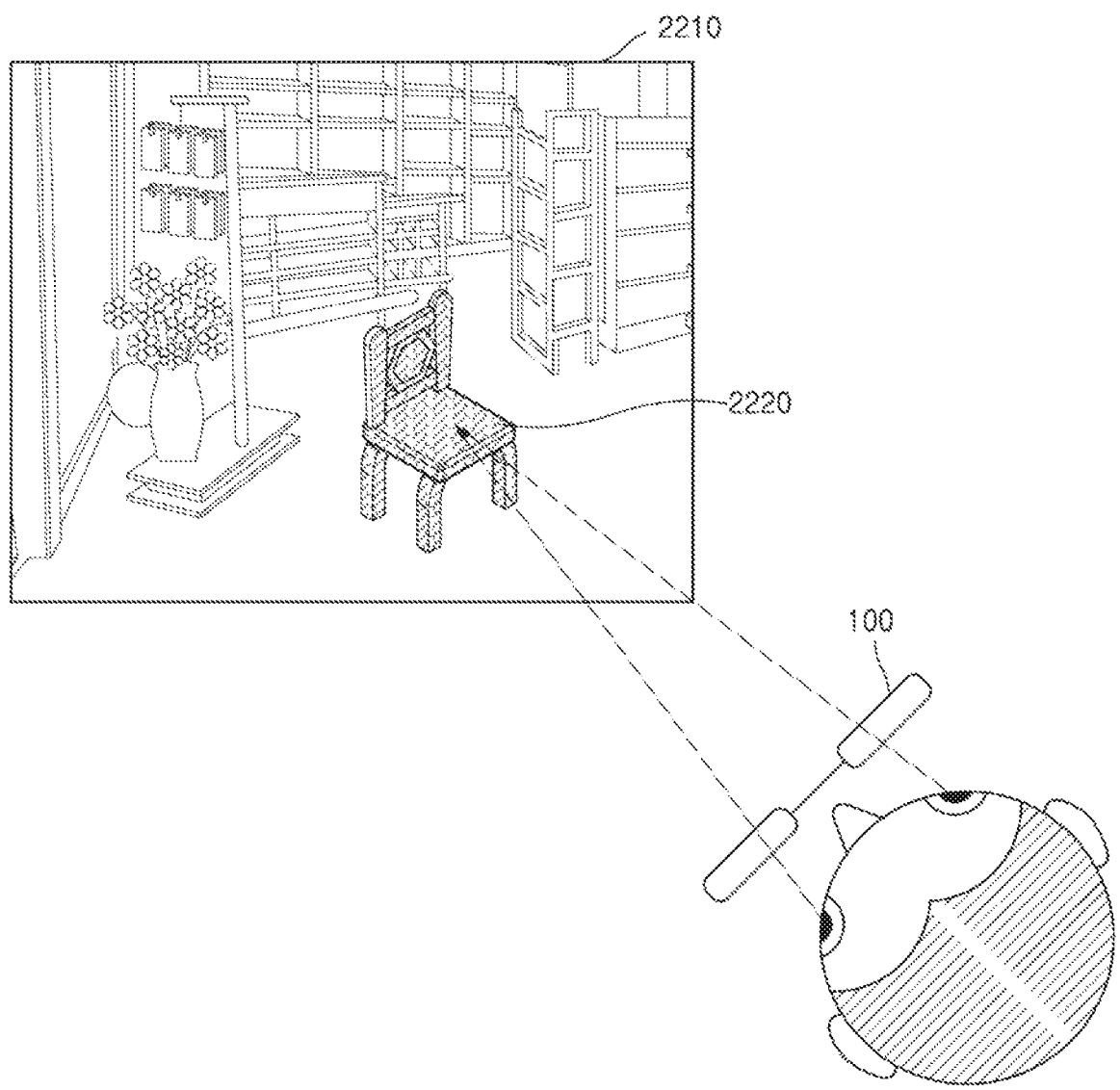
FIG. 22 is a diagram for describing a method performed by an electronic device to perform eye based spatial modeling according to an embodiment of the disclosure.

FIG. 22 is a diagram for describing a method, performed by the electronic device 100, of performing eye based spatial modeling according to an embodiment of the disclosure.

Referring to FIG. 22, a whole space 2210 illustrated in FIG. 22 represents a space within a range that a depth sensor included in the electronic device 100 is capable of sensing. According to an embodiment of the disclosure, the electronic device 100 may obtain the eye information of a user using an eye tracking sensor. For example, as described with reference to FIGS. 2 to 4B, the electronic device 100 may obtain 2D location information and depth information about a point or a space gazed by the user of the electronic device 100. The electronic device 100 may obtain the depth information about the point or the space (the gaze point) gazed by the user based on the obtained information. This is described in detail with reference to FIGS. 1 to 19, and thus a detailed description thereof will be omitted. For example, when the user gazes at a chair 2220 in the whole space 2210, the electronic device 100 may obtain depth information about the chair 2220. The electronic device 100 may overlap and display a virtual object around the chair 2220 based on depth information about the chair 2220.

In addition, when the eye of the user moves, the electronic device 100 may obtain depth information about a space to which the eye of the user moves based on information (2D location information and depth information) of the space to which the eye of the user has moved.

According to an embodiment of the disclosure, the electronic device 100 may obtain the eye information of the user in real time, obtain a gaze point in the whole space 2210 based on the eye information of the user, set a region previously set with respect to the obtained gaze point as an ROI, and obtain depth information about only the determined ROI. The electronic device 100 may perform modeling on the ROI based on the acquired depth information.

Accordingly, the electronic device 100 may perform modeling only on a required space, thereby increasing modeling speed and reducing power consumption.

The method of operating the electronic device according to an embodiment of the disclosure may be implemented in the form of program commands that can be executed through various computer components and recorded in a computer-readable recording medium. The computer-readable recording medium may include a program command, a data file, a data structure and the like solely or in a combined manner. The program command recorded in the computer-readable recording medium may be a program command specially designed and configured for the embodiments of the disclosure or a program command known to be used by those of skill in the art of the computer software field. Examples of the computer-readable recording medium may include magnetic media such as a hard disk, a floppy disk, and magnetic tape, optical media such as compact disk read only memory (CD-ROM) and digital versatile disk (DVD), magneto-optical media such as a floptical disk, and a hardware device especially configured to store and execute a program command, such as read only memory (ROM), random access memory (RAM) and flash memory, etc. Further, examples of the program commands include machine language code created by a compiler and high-level language code executable by a computer using an interpreter.

Also, the electronic device and the operation method thereof, according to the described embodiments of the disclosure, may be included and provided in a computer program product. The computer program product may be traded as a product between a seller and a buyer.

The computer program product may include a software (S/W) program and a computer-readable storage medium with a S/W program stored therein. For example, the computer program product may include products in the form of S/W programs (e.g., downloadable apps) distributed electronically through manufacturers of electronic devices or electronic markets (e.g., Google Play Store and App Store). For electronic distribution, at least a portion of the S/W program may be stored in a storage medium or may be generated temporarily. In this case, the storage medium may be a storage medium of a server of a manufacturer, a server of an electronic market, or a relay server for temporarily storing an S/W program.

In a system including a server and a client device, the computer program product may include a storage medium of the server or a storage medium of the client device. Alternatively, when there is a third device (e.g., a smartphone) communicatively connected to the server or the client device, the computer program product may include a storage medium of the third device. Alternatively, the computer program product may include the S/W program itself that is transmitted from the server to the client device or the third device or transmitted from the third device to the client device.

In this case, one of the server, the client device, and the third device may execute the computer program product to perform the method according to the described embodiments of the disclosure. Alternatively, two or more of the server, the client device, and the third device may execute the computer program product to perform the method according to the described embodiments of the disclosure in a distributed manner.

For example, the server (e.g., a cloud server or an AI server) may execute the computer program product stored in the server, to control the client device communicatively connected to the server to perform the method according to the described embodiments of the disclosure.

An electronic device according to an embodiment of the disclosure may obtain depth information based on a gaze point, and thus the efficiency of depth sensing may increase and power consumption may decrease.

An electronic device according to an embodiment of the disclosure may obtain depth information using a parameter optimized for a gaze point, thereby improving the accuracy of the depth information.

Although the embodiments of the disclosure have been described above in detail, the scope of the disclosure is not limited thereto and those of ordinary skill in the art will understand that various modifications and improvements may be made therein without departing from the spirit and scope of the disclosure as defined by the following claims.

What is claimed is:

1. A head-mounted display device comprising:
an eye tracking circuitry;
a depth sensor including a light emitter, wherein the light emitter comprises light sources disposed in a plurality of regions; and
one or more processors configured to:
control the eye tracking circuitry to obtain a direction of a left eye of a user and a direction of a right eye of the user,
obtain 2D location of a gaze point of the user based on the obtained direction of the left eye of the user and the obtained direction of the right eye of the user,
determine a region, among the plurality of regions, corresponding to the obtained 2D location of the gaze point of the user,
control the light sources disposed in the determined region to output light, and
obtain depth information about one or more objects, based on the output light by the light sources disposed in the determined region.

2. The head-mounted display device of claim 1, wherein the one or more processors is further configured to obtain the depth measurement parameter of the depth sensor including at least one of a width of a pulse or a magnitude of light emitted by the light emitter based on the obtained depth information about the one or more objects, and wherein the depth sensor is further configured to re-obtain the depth information about the one or more objects based on the obtained depth measurement parameter.

3. The head-mounted display device of claim 1, wherein the depth sensor is further configured to obtain the depth information about the one or more objects by using at least one of a time of flight (TOF) method, a structured light (SL) method, or a stereo image (SI) method.

4. The head-mounted display device of claim 3, wherein, when the depth sensor comprises a TOF depth sensor, the one or more processors is further configured to determine the depth information based on the 2D location information of the gaze point such that the light sources included in the light emitter disposed in the determined region are driven, and wherein the depth sensor is further configured to obtain the depth information about the one or more objects by driving the light sources.

5. The head-mounted display device of claim 1, further comprising a display displaying a real space comprising one or more objects, and wherein the one or more processors is further configured to control the display to display at least one virtual object on the one or more objects based on the depth information about the one or more objects.

6. A method of operating an electronic device, the method comprising:
obtaining, via an eye tracking circuitry, a direction of a left eye of a user and a direction of a right eye of the user;
obtaining 2D location of a gaze point of the user based on the obtained direction of the left eye of the user and the obtained direction of the right eye of the user;
determining a region, among a plurality of regions, corresponding to the obtained 2D location of the gaze point of the user;
outputting light by driving light sources included in a light emitter of a depth sensor disposed in a region, among the plurality of regions, corresponding to the 2D location of the gaze point of the user; and
obtaining depth information about one or more objects, based on the output light by the light sources of the depth sensor disposed in the determined region.

7. The method of claim 6, further comprising:
obtaining a depth measurement parameter of the depth sensor including at least one of a width of a pulse or a magnitude of light emitted by the light emitter based on the obtained depth information about the one or more objects; and
re-obtaining the depth information about the one or more objects based on the obtained depth measurement parameter.

8. The method of claim 6, wherein the obtaining of the depth information about the one or more objects comprises obtaining the depth information about the one or more objects by using at least one of a time of flight (TOF) method, a structured light (SL) method, or a stereo image (SI) method.

9. The method of claim 8, wherein the obtaining of the depth information comprises when obtaining the depth information using the TOF method, determining the depth information based on the 2D location information of the gaze point such that the light sources included in the light emitter disposed in the region corresponding to the 2D location information of the gaze point of the user are driven, and the obtaining of the depth information about the one or more objects comprises obtaining the depth information about the one or more objects by driving the light sources.

10. A non-transitory computer-readable recording medium having recorded thereon a program for executing the method of claim 6.

11. The head-mounted display device of claim 2, wherein the depth measurement parameter of the depth sensor further includes a sensing speed of a reflected light by the depth sensor and a sensing sensitivity of depth sensor.

* * * * *